(12) United States Patent
Kim et al.

(10) Patent No.: US 9,807,471 B2
(45) Date of Patent: Oct. 31, 2017

(54) METHOD FOR OPERATING IMAGE DISPLAY DEVICE

(71) Applicant: LG ELECTRONICS INC., Seoul (KR)

(72) Inventors: Hyungjin Kim, Seoul (KR); Jongmin Baek, Seoul (KR); Seungwon Ryu, Seoul (KR); Kunsik Lee, Seoul (KR); Misuk Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/456,840

(22) Filed: Aug. 11, 2014

(65) Prior Publication Data

US 2015/0296273 A1   Oct. 15, 2015

(30) Foreign Application Priority Data

Apr. 15, 2014   (KR) ........................ 10-2014-0044814

(51) Int. Cl.
| | | |
|---|---|---|
| *H04N 7/10* | (2006.01) | |
| *H04N 21/81* | (2011.01) | |
| *H04N 21/422* | (2011.01) | |
| *H04N 21/431* | (2011.01) | |
| *H04N 21/478* | (2011.01) | |

(52) U.S. Cl.
CPC ... *H04N 21/8173* (2013.01); *H04N 21/42201* (2013.01); *H04N 21/42202* (2013.01); *H04N 21/42204* (2013.01); *H04N 21/4312* (2013.01); *H04N 21/4781* (2013.01)

(58) Field of Classification Search
CPC ........... H04N 21/8173; H04N 21/4781; H04N 21/812; H04N 21/42202; H04N 21/4312; H04N 21/42201; H04N 21/818; H04N 21/42204
USPC .......................................................... 725/32
See application file for complete search history.

(56) References Cited

U.S. PATENT DOCUMENTS

| | | | | |
|---|---|---|---|---|
| 6,921,336 B1 * | 7/2005 | Best | ........................ | A63F 13/10 463/32 |
| 7,712,125 B2 * | 5/2010 | Herigstad | .............. | H04N 7/163 725/109 |
| 8,531,050 B2 * | 9/2013 | Barney | ................... | A63F 13/10 290/1 R |

(Continued)

FOREIGN PATENT DOCUMENTS

WO   2012/051620   4/2012

OTHER PUBLICATIONS

"Prima facie, adv. and adj. (and n.)." OED Online. Oxford University Press, Sep. 2016. Web. Sep. 30, 2016. <http://www.oed.com/view/Entry/151264>.*

(Continued)

*Primary Examiner* — Michael B Pierorazio
(74) *Attorney, Agent, or Firm* — Lee Hong Degerman Kang & Waimey

(57) ABSTRACT

In an operation method of an image display device receiving a broadcast signal, interworking with an interworking device, and including a display unit, an event related to the broadcast signal or an event occurring from the interworking device is obtained. Related applications are recommended on the basis of at least one of the obtained events through the display unit.

17 Claims, 44 Drawing Sheets

(56) References Cited

U.S. PATENT DOCUMENTS

| | | | |
|---|---|---|---|
| 8,698,746 B1* | 4/2014 | Merrick | G06F 3/038 178/19.05 |
| 8,740,708 B2* | 6/2014 | Karacal | A63F 13/06 463/38 |
| 8,830,170 B2* | 9/2014 | Kao | G06F 3/0325 345/156 |
| 9,272,183 B2* | 3/2016 | Quy | A61B 5/6826 |
| 2002/0162120 A1 | 10/2002 | Mitchell | H04N 7/165 725/135 |
| 2003/0216177 A1* | 11/2003 | Aonuma | A63F 13/10 463/32 |
| 2005/0210502 A1* | 9/2005 | Flickinger | G06Q 30/02 725/34 |
| 2006/0041472 A1* | 2/2006 | Lukose | G06Q 30/00 705/14.66 |
| 2007/0022437 A1* | 1/2007 | Gerken | H04N 7/17318 725/41 |
| 2007/0052177 A1* | 3/2007 | Ikeda | A63F 13/06 273/317 |
| 2007/0060391 A1* | 3/2007 | Ikeda | A63F 13/06 463/46 |
| 2007/0124775 A1* | 5/2007 | DaCosta | H04N 7/17318 725/62 |
| 2008/0082510 A1* | 4/2008 | Wang | H04H 60/37 |
| 2008/0172696 A1 | 7/2008 | Furusawa et al. | |
| 2008/0178241 A1* | 7/2008 | Gilboy | H04N 7/17318 725/114 |
| 2009/0067847 A1* | 3/2009 | Nakamura | G08C 23/04 398/128 |
| 2009/0163274 A1* | 6/2009 | Kando | A63F 13/10 463/31 |
| 2009/0249388 A1* | 10/2009 | Seidel | H04N 21/4126 725/32 |
| 2010/0192173 A1* | 7/2010 | Mizuki | A63F 13/12 725/25 |
| 2010/0199318 A1* | 8/2010 | Chang | H04N 7/17318 725/97 |
| 2011/0190052 A1* | 8/2011 | Takeda | A63F 13/02 463/31 |
| 2011/0247042 A1* | 10/2011 | Mallinson | G06F 17/30026 725/86 |
| 2012/0046767 A1* | 2/2012 | Shimohata | A63F 13/08 700/91 |
| 2012/0133582 A1* | 5/2012 | Ohsawa | G06F 3/0325 345/157 |
| 2012/0192222 A1* | 7/2012 | Kumar | G06Q 30/0251 725/32 |
| 2012/0192228 A1* | 7/2012 | Zito | G06F 17/30035 725/34 |
| 2012/0309515 A1* | 12/2012 | Chung | H04N 21/274 463/31 |
| 2013/0013419 A1 | 1/2013 | Sim et al. | |
| 2013/0171897 A1* | 7/2013 | Hsu Tang | B32B 5/22 442/76 |
| 2013/0238413 A1* | 9/2013 | Carlson | G06Q 30/0224 705/14.25 |
| 2013/0326557 A1 | 12/2013 | Kang et al. | |
| 2013/0335226 A1* | 12/2013 | Shen | H04R 5/033 340/573.1 |
| 2014/0052513 A1* | 2/2014 | Ryan | G06Q 30/0255 705/14.16 |
| 2014/0059599 A1 | 2/2014 | Sirpal et al. | |
| 2014/0168071 A1* | 6/2014 | Ahmed | H04N 5/23206 345/156 |
| 2015/0121418 A1* | 4/2015 | Jain | H04N 21/812 725/32 |

OTHER PUBLICATIONS

PCT International Application No. PCT/KR2014/006153 Written Opinion of the International Searching Authority dated Jan. 12, 2015, 3 pages.

* cited by examiner

FIG.8
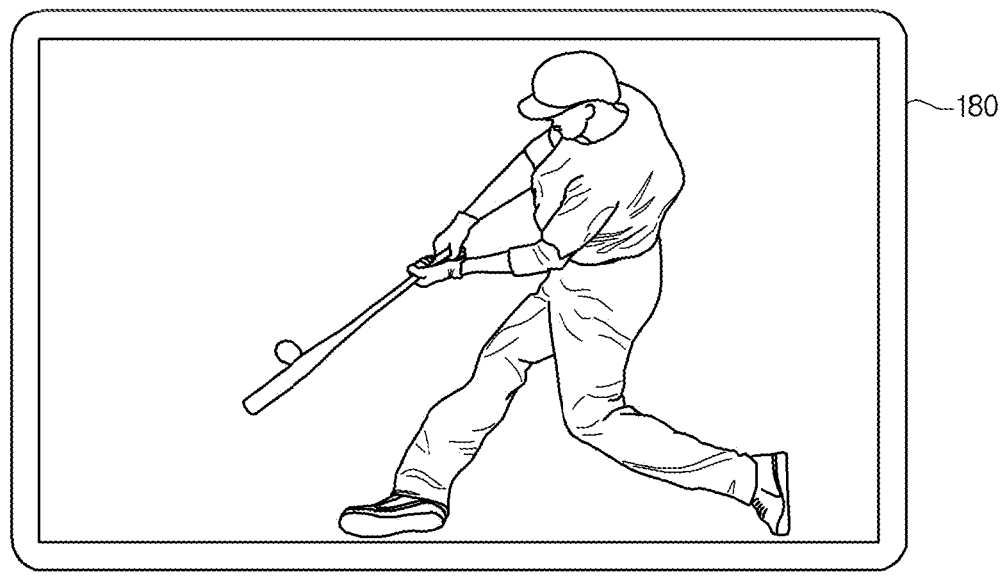
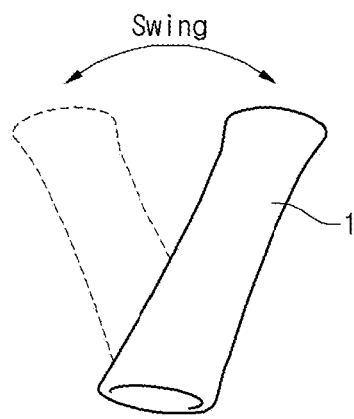
< Stick >
(a)
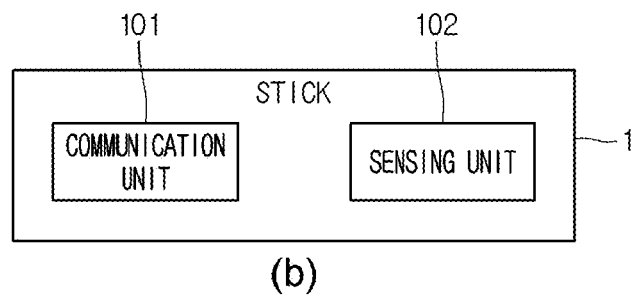
(b)

FIG.9
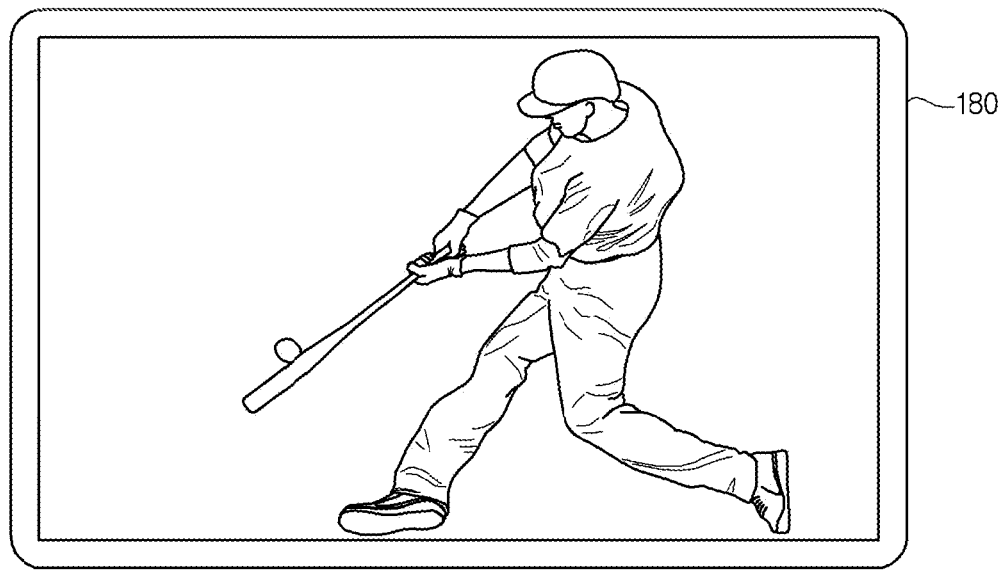
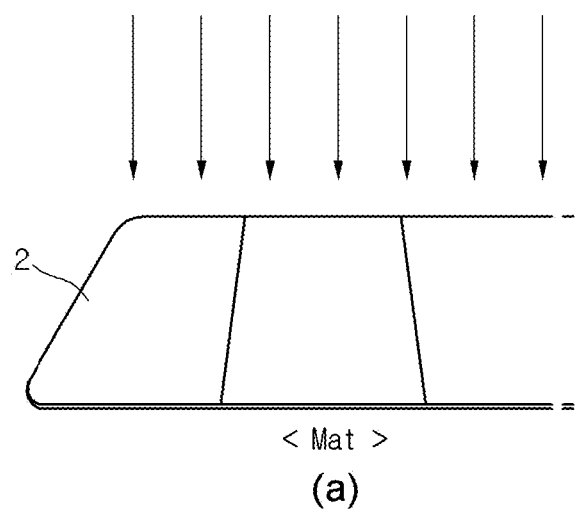
< Mat >
(a)
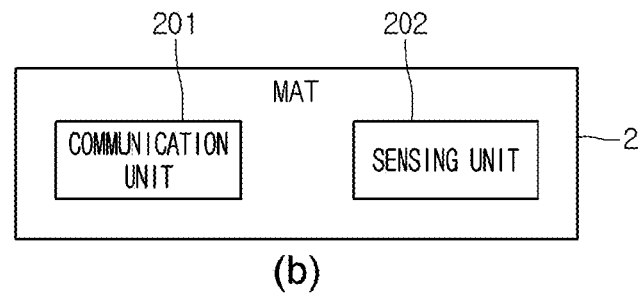
(b)

FIG.10
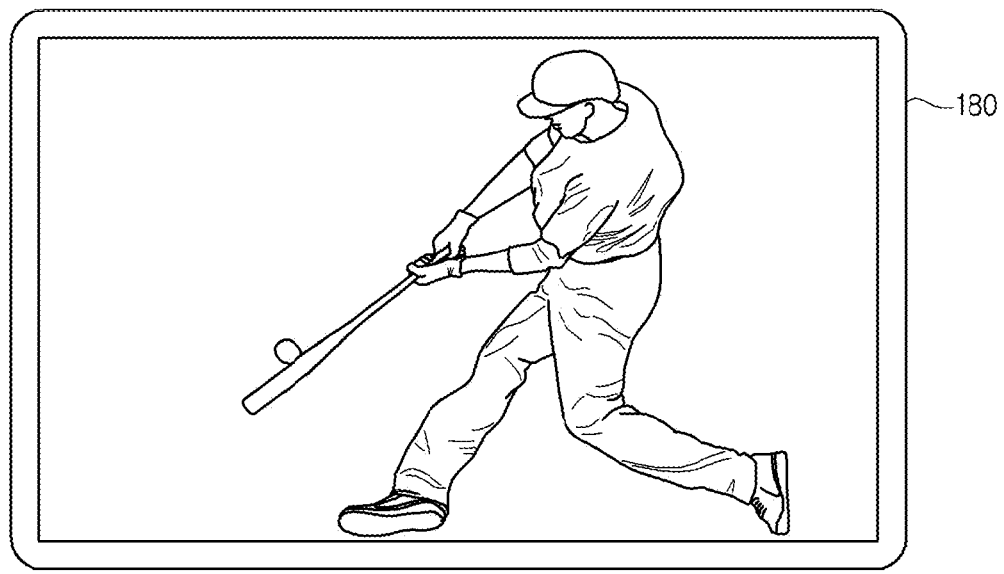
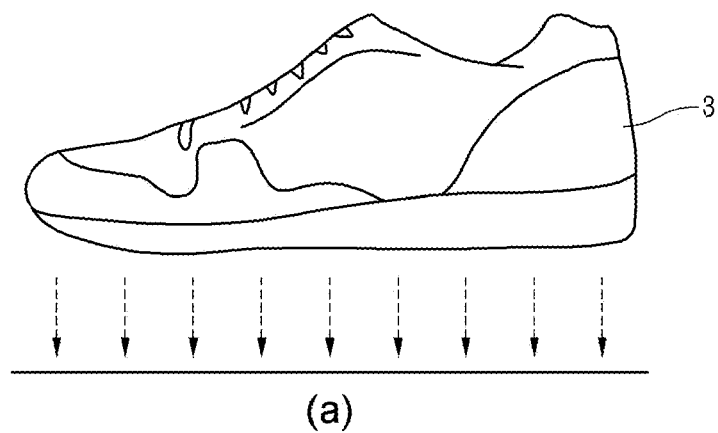
(a)
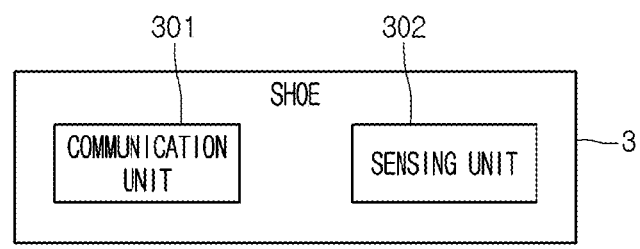
(b)

FIG.11
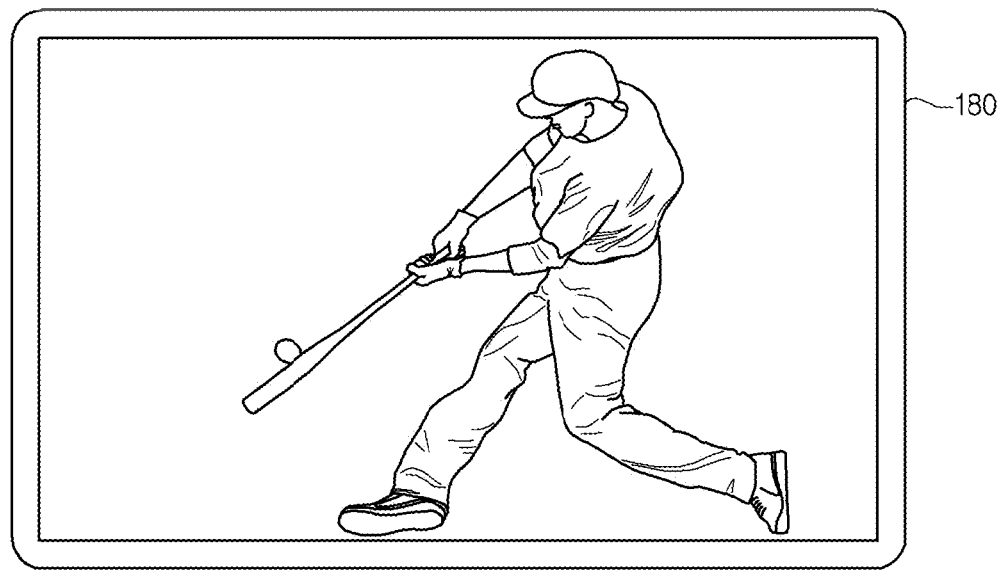
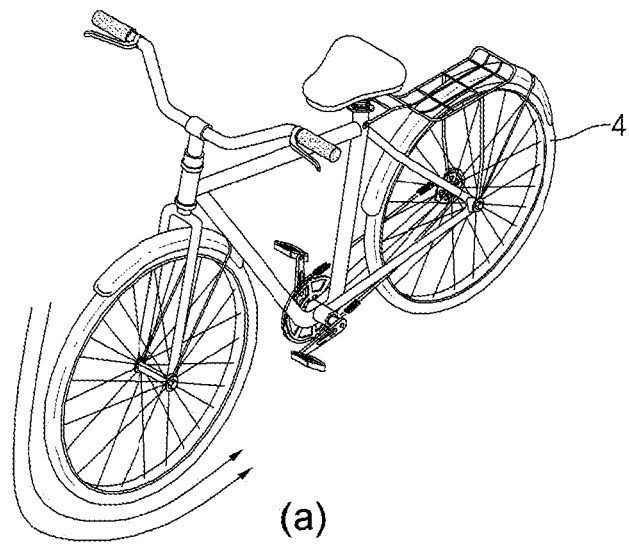
(a)
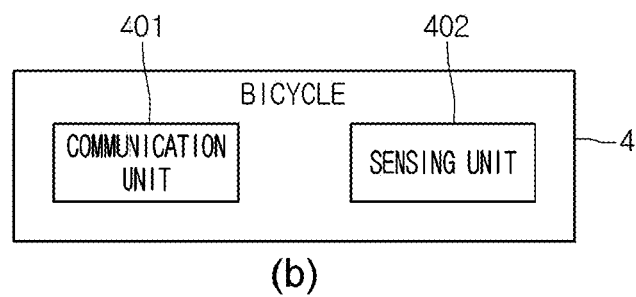
(b)

FIG.12
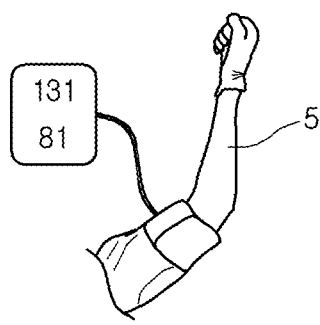
(a)
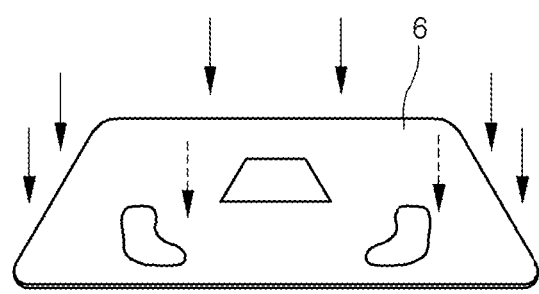
(b)
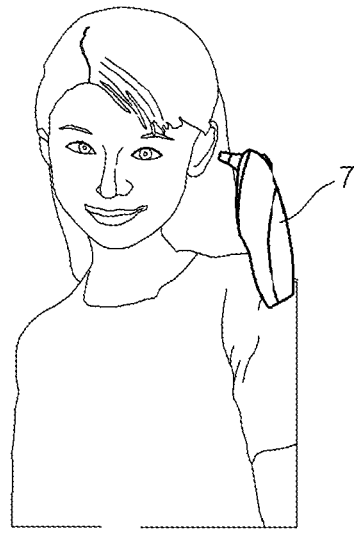
(c)

FIG.13
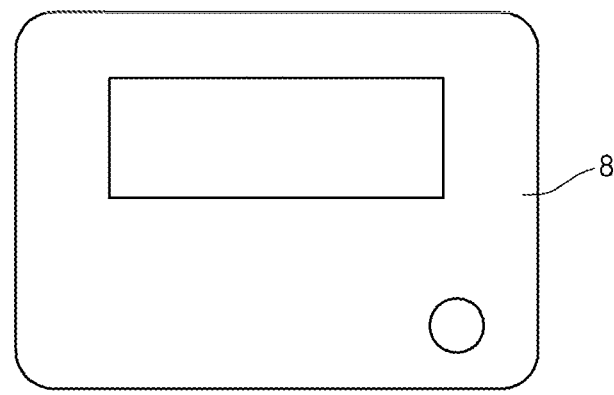
(a)
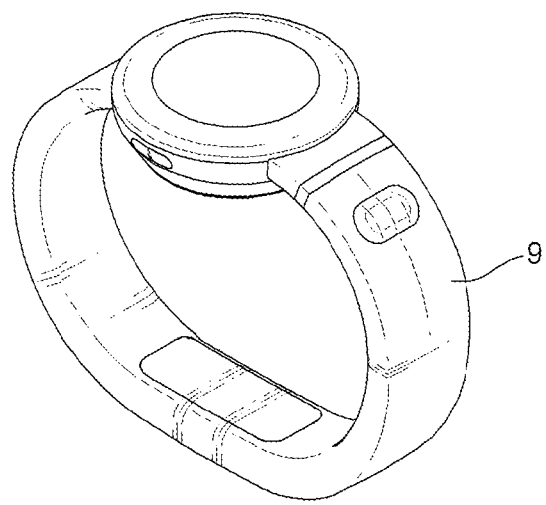
(b)

FIG.21
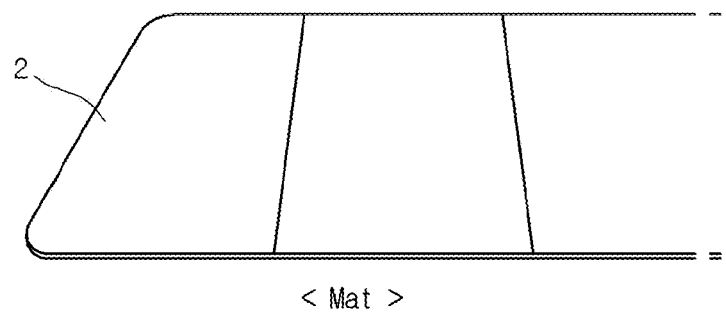
< Mat >
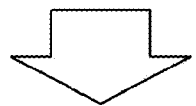
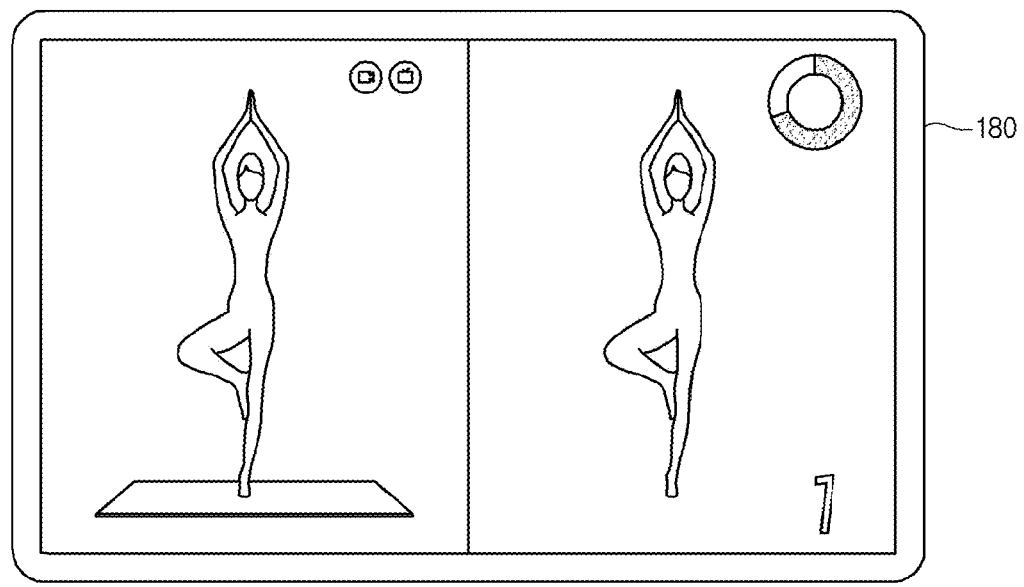

FIG.22
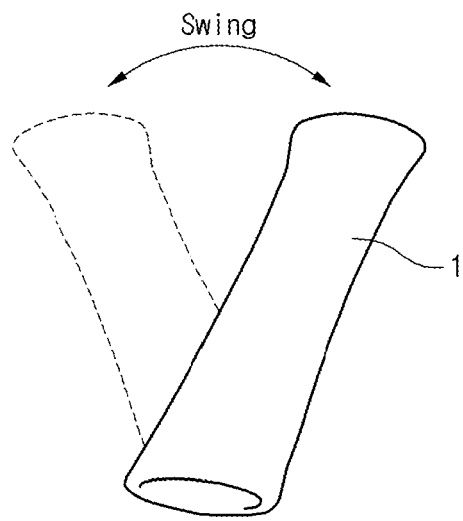
< Stick >
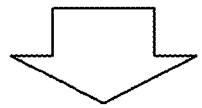
DUMBBELL APP
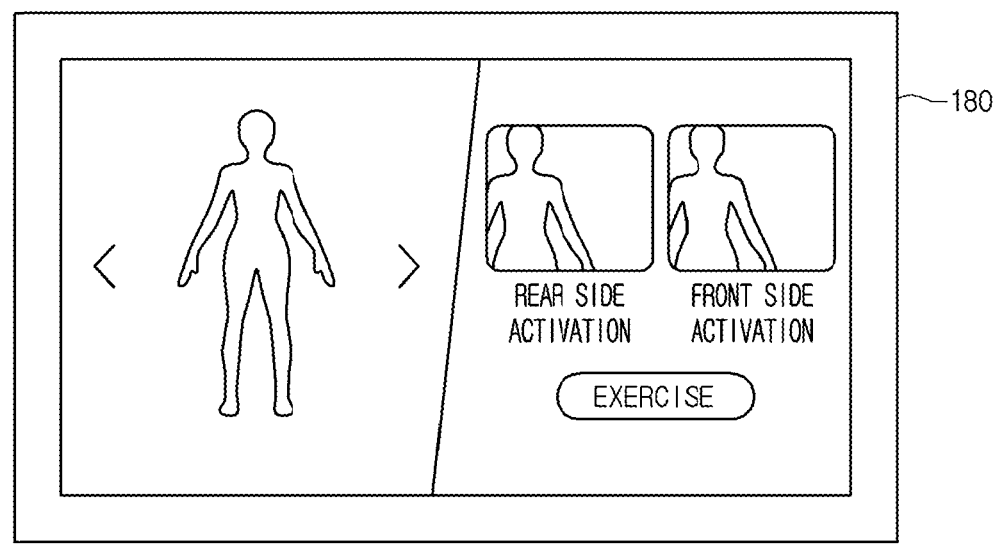

FIG.25
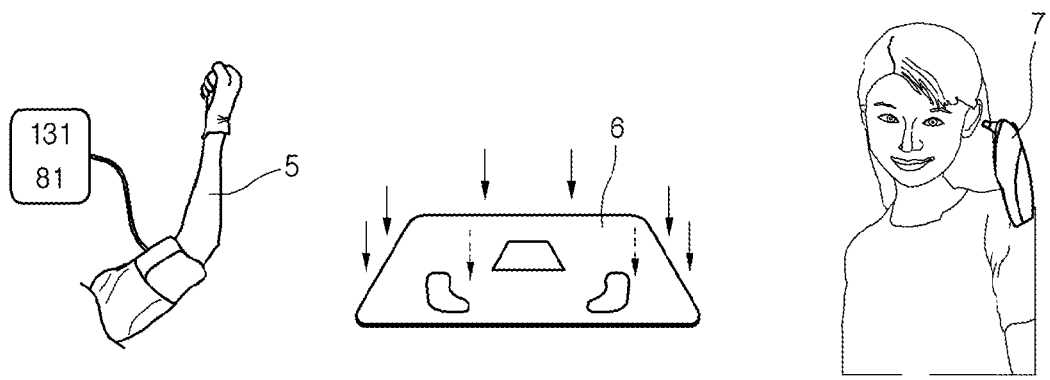
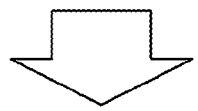
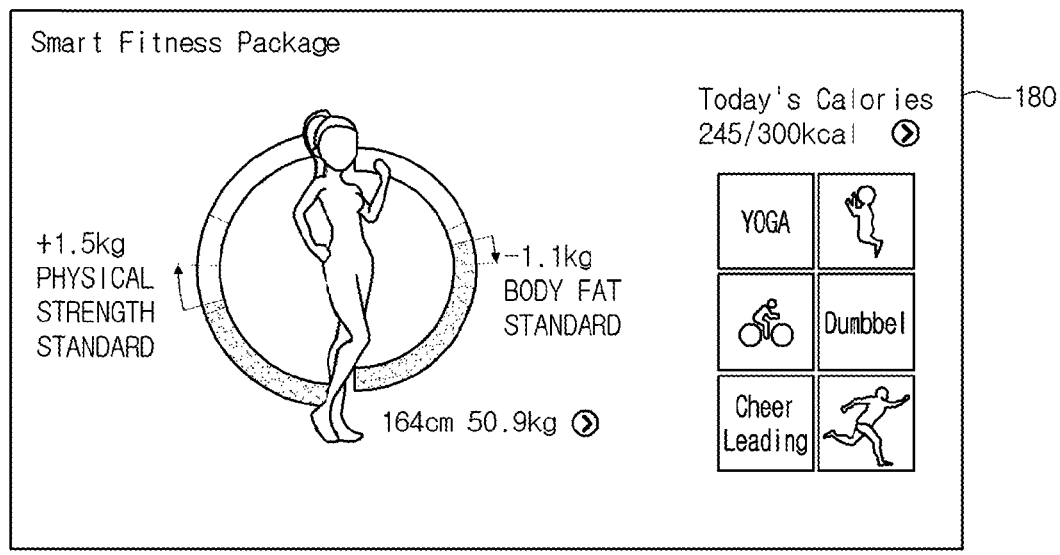

<START MID-PROGRAM ADS>

BROADCAST MID-PROGRAM ADS FOR 10 MINUTES AND ADS END

RECOMMEND APPLICATION
EXECUTABLE FOR 10 MINUTES

FIG.35
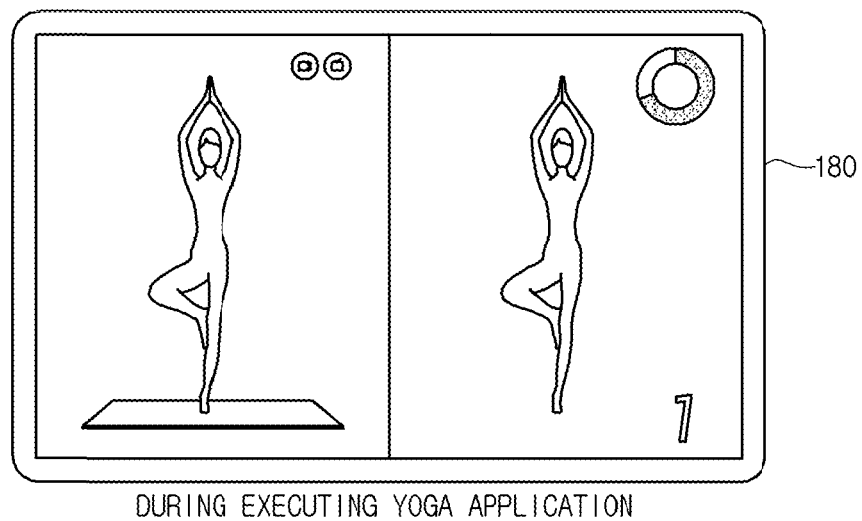
DURING EXECUTING YOGA APPLICATION
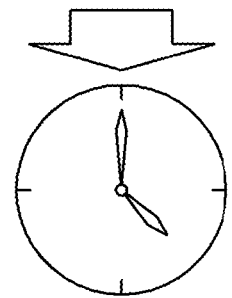
<RESERVED PROGRAM START TIME>
15 MINUTES BEFORE START
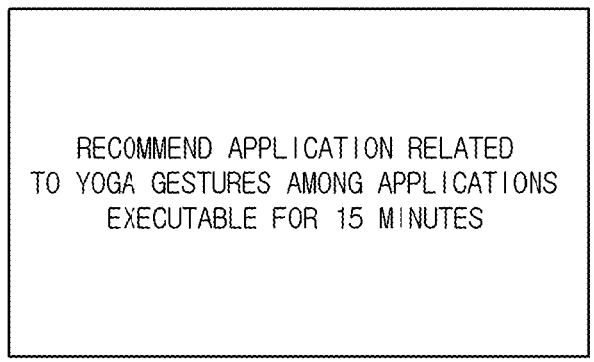

FIG.44
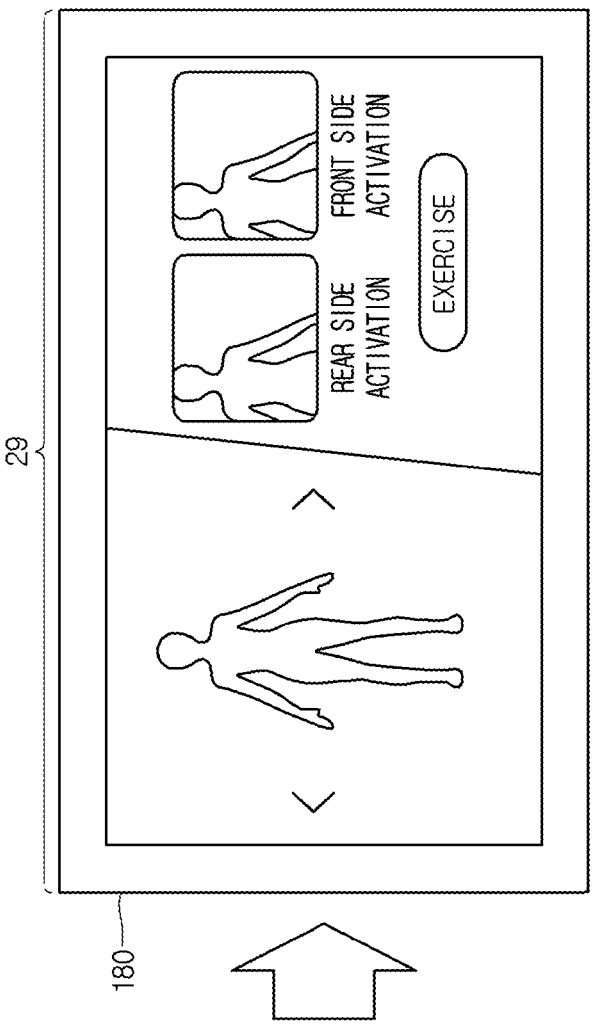
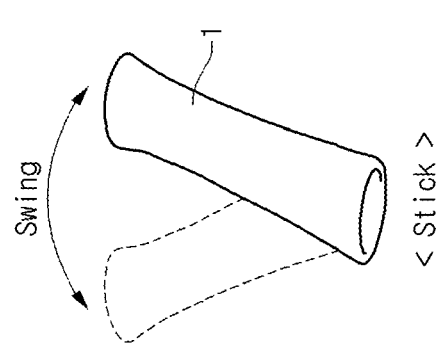

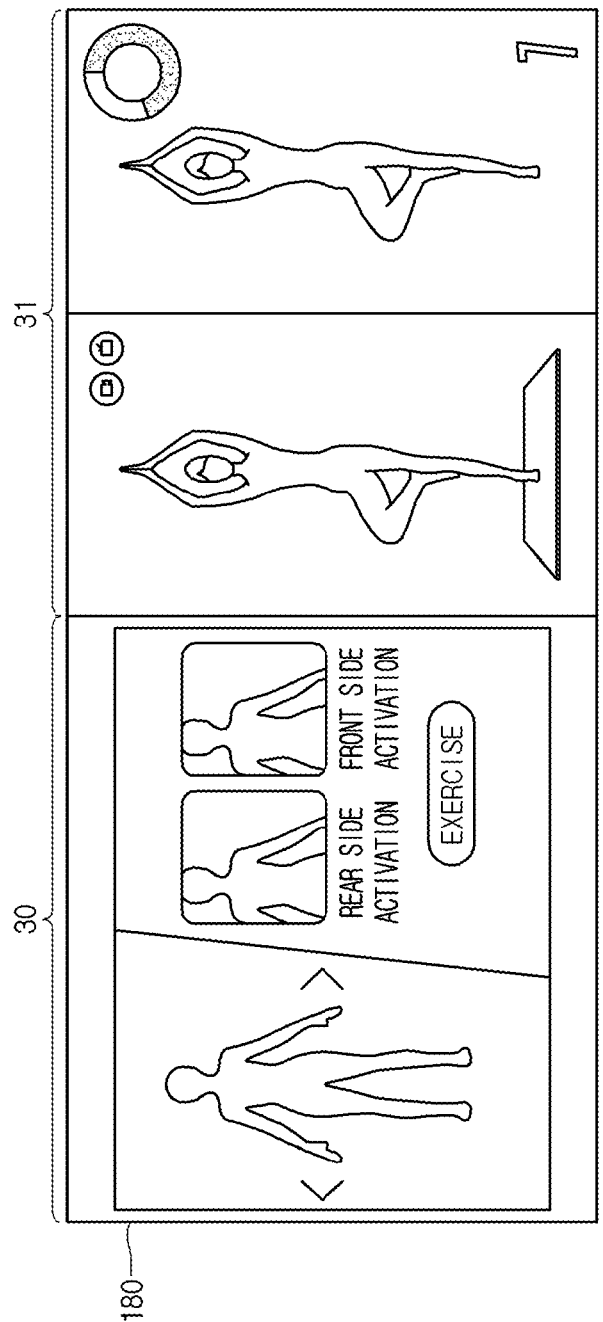

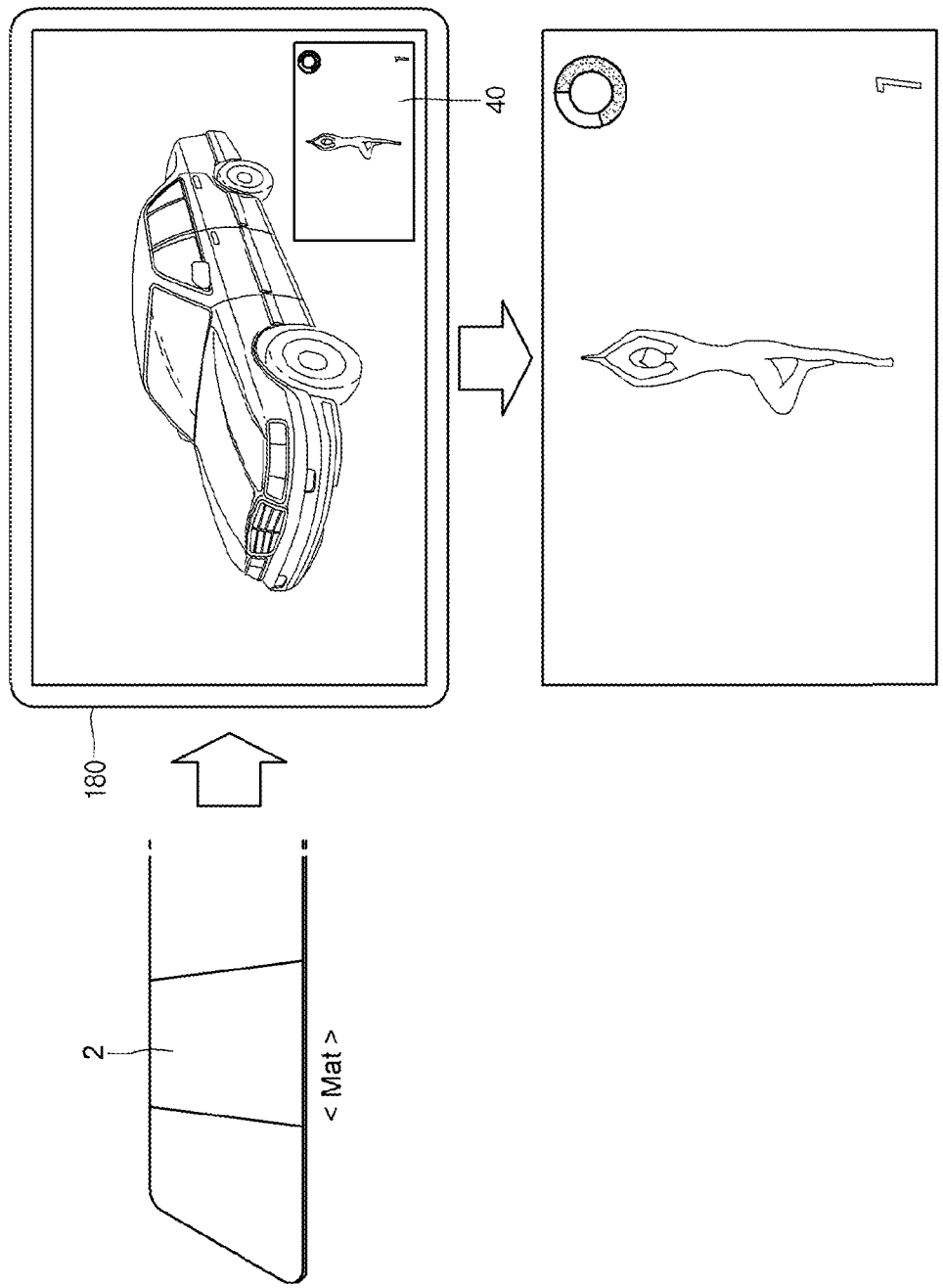

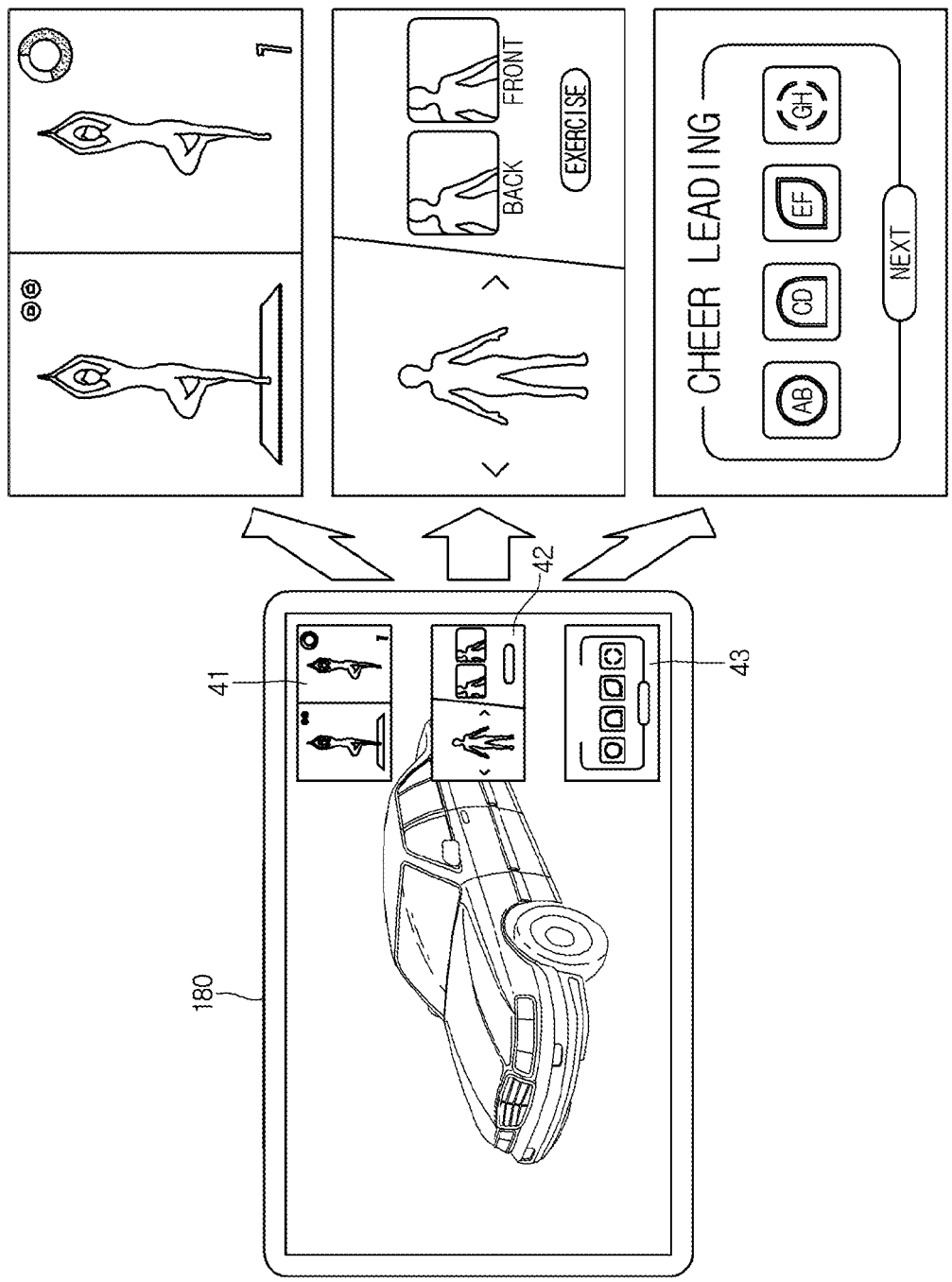

METHOD FOR OPERATING IMAGE DISPLAY DEVICE

CROSS-REFERENCE TO RELATED APPLICATION

Pursuant to 35 U.S.C. §119(a), this application claims the benefit of earlier filing date and right of priority to Korean Application No. 10-2014-0044814, filed on Apr. 15, 2014, the contents of which are all incorporated by reference herein in their entirety.

BACKGROUND OF THE INVENTION

Field of the Invention

The present disclosure relates to an image display device and an operation method thereof, and particularly, to an image display device and an operation method thereof providing a related application interface to a user on the basis of an event inside the image display device or an event from an interworking device, and user's health information.

Description of the Related Art

Image display devices are devices for displaying and representing images, characters, or figures.

Image display devices have been typically used for displaying images of an original purpose. However, as advanced image display devices are recently emerged, various additional functions are provided through the image display device besides the image display function.

Since equipped with a function of allowing users to transmit and receive information with TVs, these image display devices provide various functions which meet the users' needs in comparison to the existing TVs unilaterally delivering information.

Thus the image display device is called as an interactive TV. The image display device may be connected to an internet line through a wired or wireless communication network and provide various functions such as web surfing and VOD viewing, social network service, or game.

In addition, the image display device may provide a function of receiving images or photos through a network or an external storage device and displaying them. Accordingly, the user may see the images or photos through a large screen of the image display device.

In addition, the image display device may operate various applications driven in a mobile terminal.

Various applications driven in the image display device include a social network service (SNS) or a game, and in particular, include a fitness application interworking with an interworking device capable of interworking with the image display device and helping user's exercise.

However, when this fitness application is driven in the image display device, viewing the advanced image display device may be hampered.

In addition, it is also cumbersome to connect, to the image display device, the interworking device interworking with the image display device at the time of driving the fitness application and drive a corresponding application by manipulating a separate remote controller.

SUMMARY OF THE INVENTION

Embodiments provide image display devices and operation methods thereof capable of providing an interface optimized to drive a necessary application in the image display device without hampering a user from viewing the image display device.

In one embodiment, an operation method of an image display device receiving a broadcast signal, interworking with an interworking device, and including a display unit, includes: obtaining an event related to the broadcast signal or an event occurring from the interworking device; and recommending related applications on the basis of at least one of the obtained events through the display unit.

According to an embodiment among various embodiments, an optimized interface between an interworking device interworking with a smart TV through an image display device and the image display device can be provided.

In addition, according to an embodiment among various embodiments, user's convenience can be increased by recommending applications related to events and previously created user information when various types of the events occur in addition to providing broadcast services through an image display device.

BRIEF DESCRIPTION OF THE DRAWINGS

FIGS. 8 to 14 illustrate views representing an operation of sensing the interworking device as an example of an event according to an embodiment.

Figure 16:
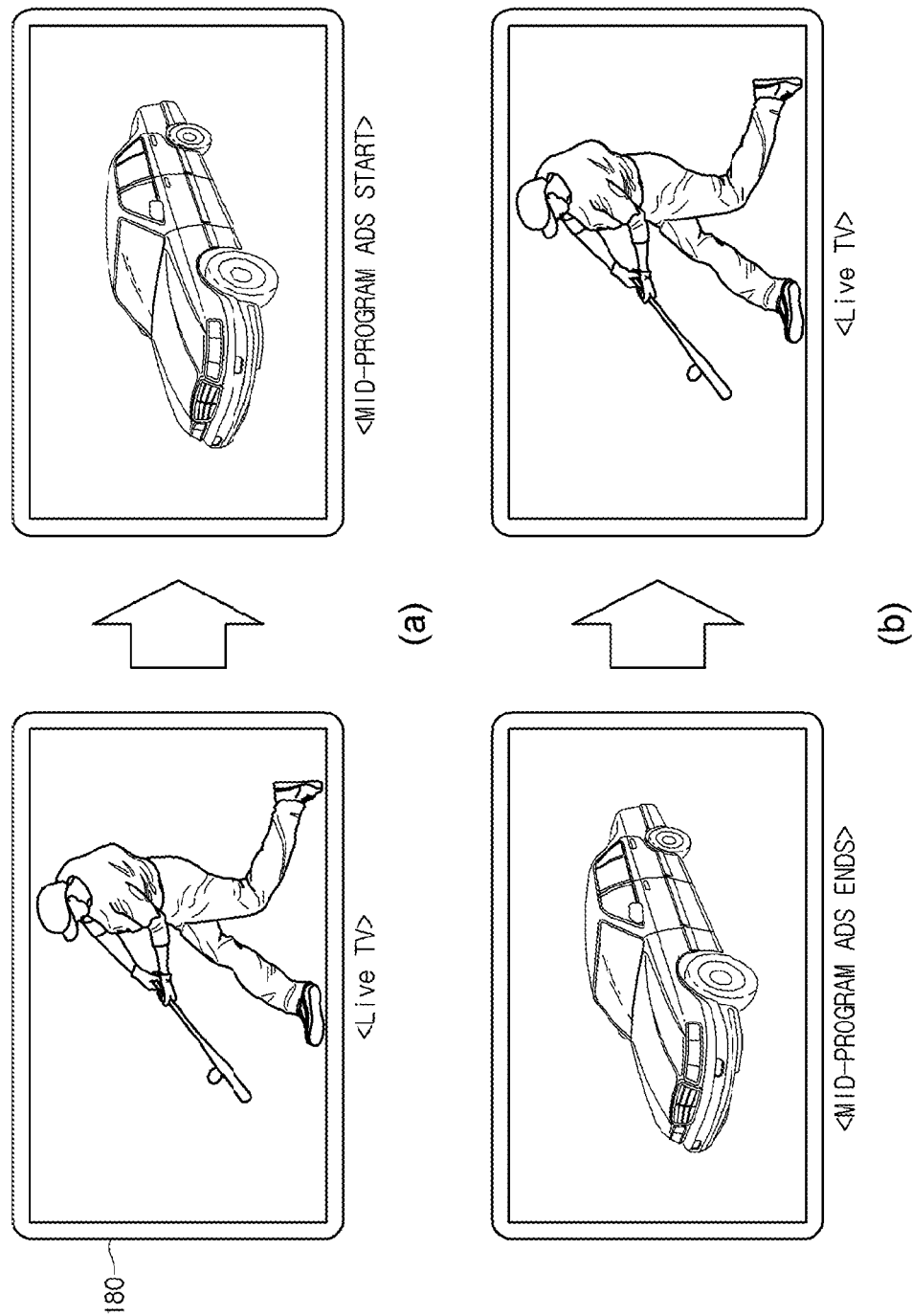
FIG. 16 illustrates exemplary events. For example, (a) of FIG. 16 illustrates, as an exemplary event, a view that a signal of mid-program ads starts to be received and displayed on a display unit during receiving the LIVE TV signal in the image display device.

(b) of FIG. 16 illustrates, as an exemplary event, a view that a TV program starts to be received again when mid-program ads are completed during receiving a signal of mid-program ads in an image display device.

Figure 17:
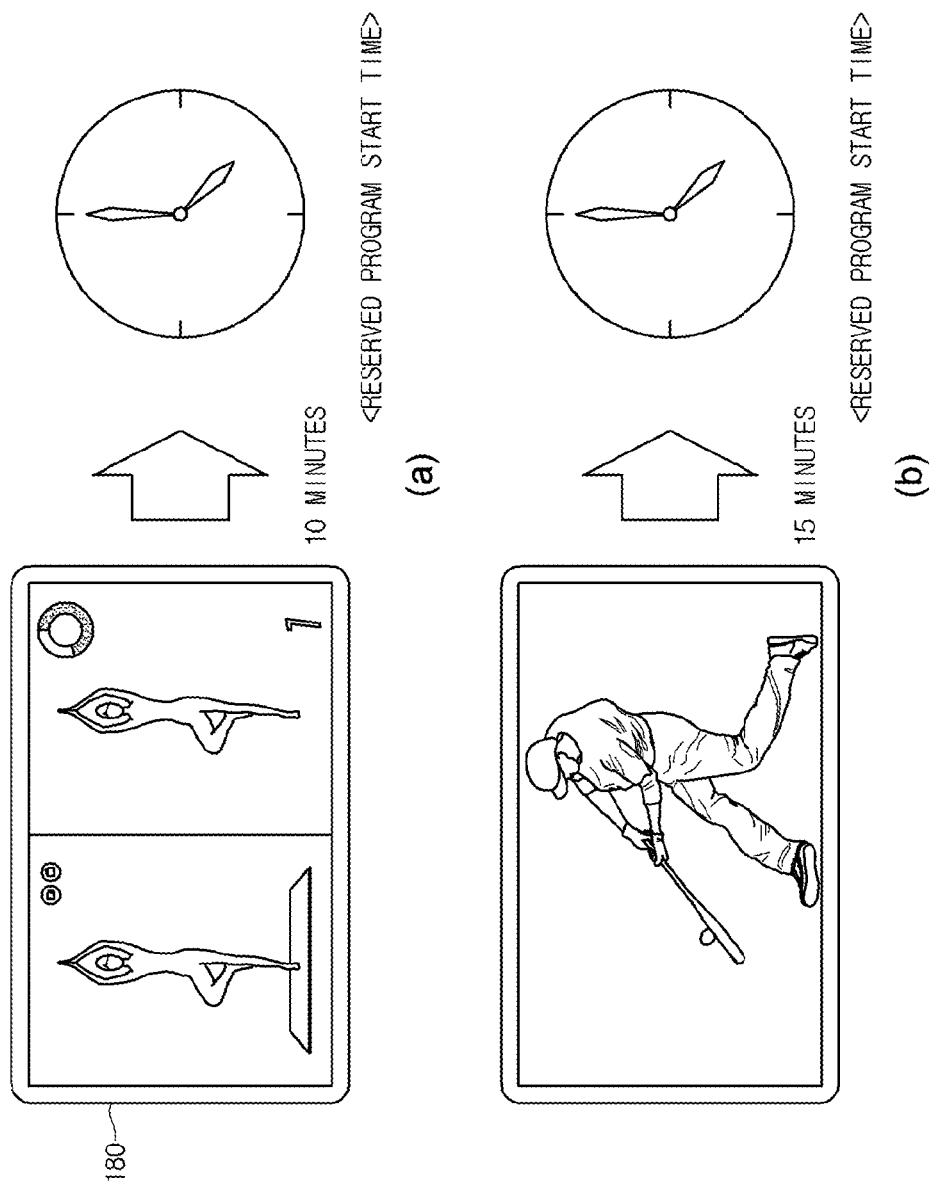

FIG. 17 illustrates exemplary events. For example, (a) of FIG. 17 illustrates, as an exemplary event, a view at a predetermined time before a start time of a reserved or preferred program arrives during executing an application in an image display device.

(b) of FIG. 17 illustrates, as an exemplary event, a view at a predetermined time before a start time of a reserved or preferred program arrives in a LIVE TV mode in an image display device.

Figure 18:
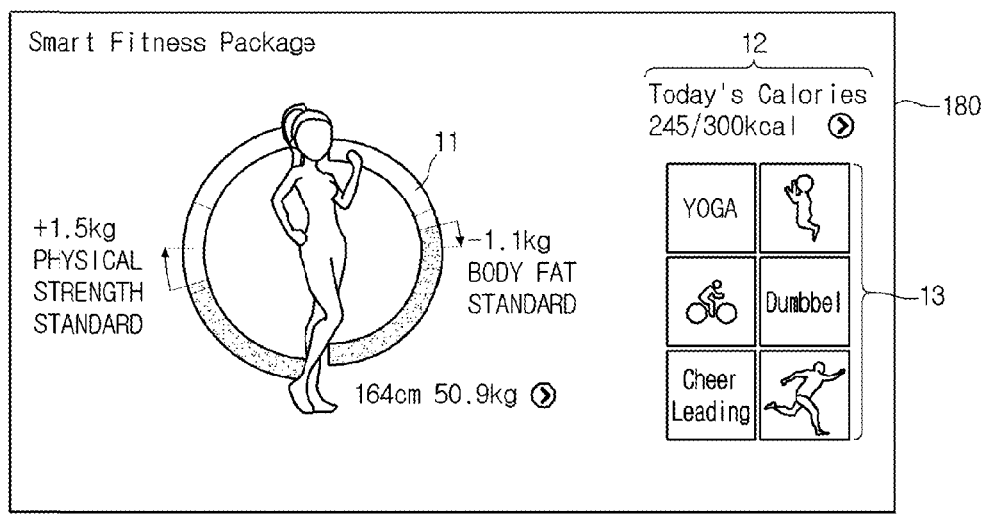

FIG. 18 illustrates an exemplary first health information application that represents user's health information including exercise information and body information according to an embodiment.

Figure 19:
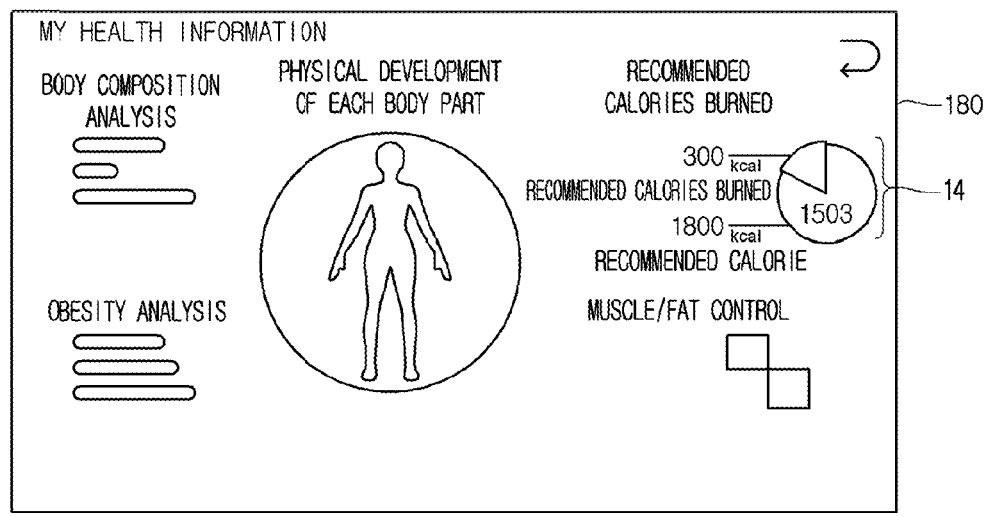

FIG. 19 illustrates an exemplary second health information application that represents user's health information including exercise information and body information according to an embodiment.

Figure 20:
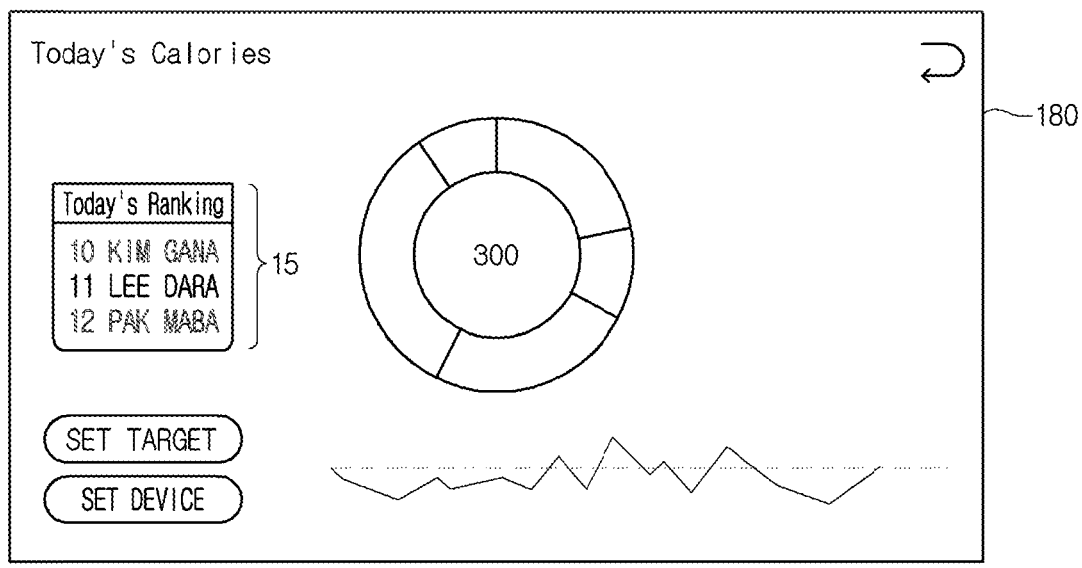

FIG. 20 illustrates an exemplary third exercise application that represents user's health information on a plurality of users in an image display device.

FIG. 21 illustrates an exemplary view that an application requiring a mat related motion is recommended on the basis of the mat.

FIG. 22 illustrates an exemplary view that an application requiring a stick related motion is recommended on the basis of the stick.

Figure 23:
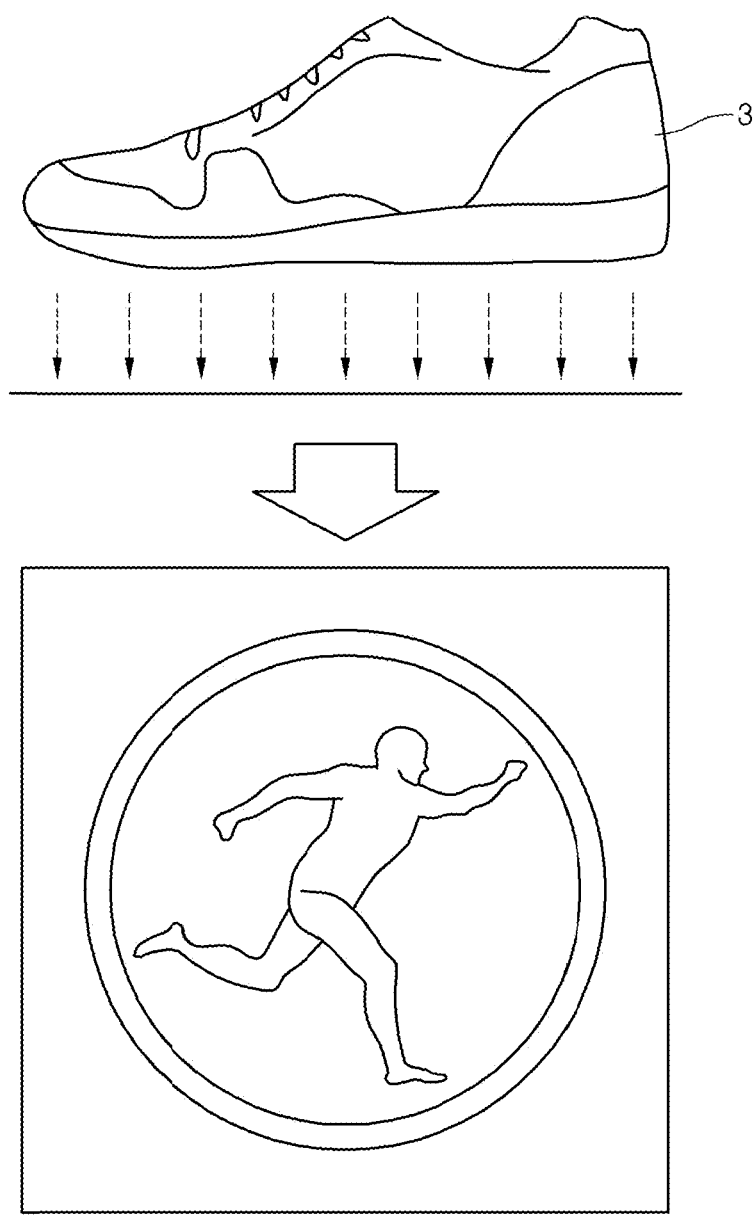

FIG. 23 illustrates an exemplary view that an application requiring a shoe related motion is recommended on the basis of the shoe.

Figure 24:
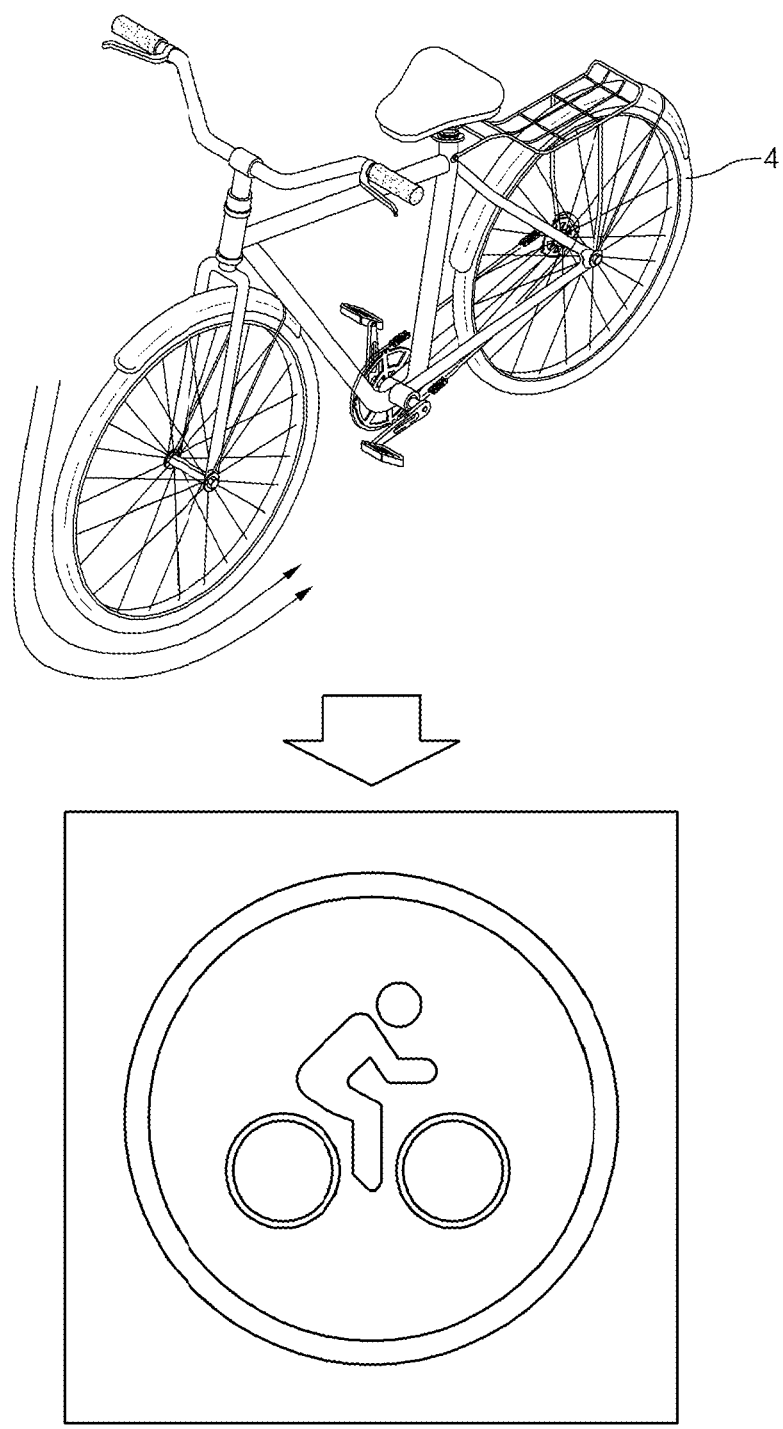

FIG. 24 illustrates an exemplary view that an application requiring a bicycle related motion is recommended on the basis of the bicycle.

FIG. 25 illustrates an exemplary view that an application related to various body information sensing devices capable of sensing user's body information is recommended.

Figure 26:
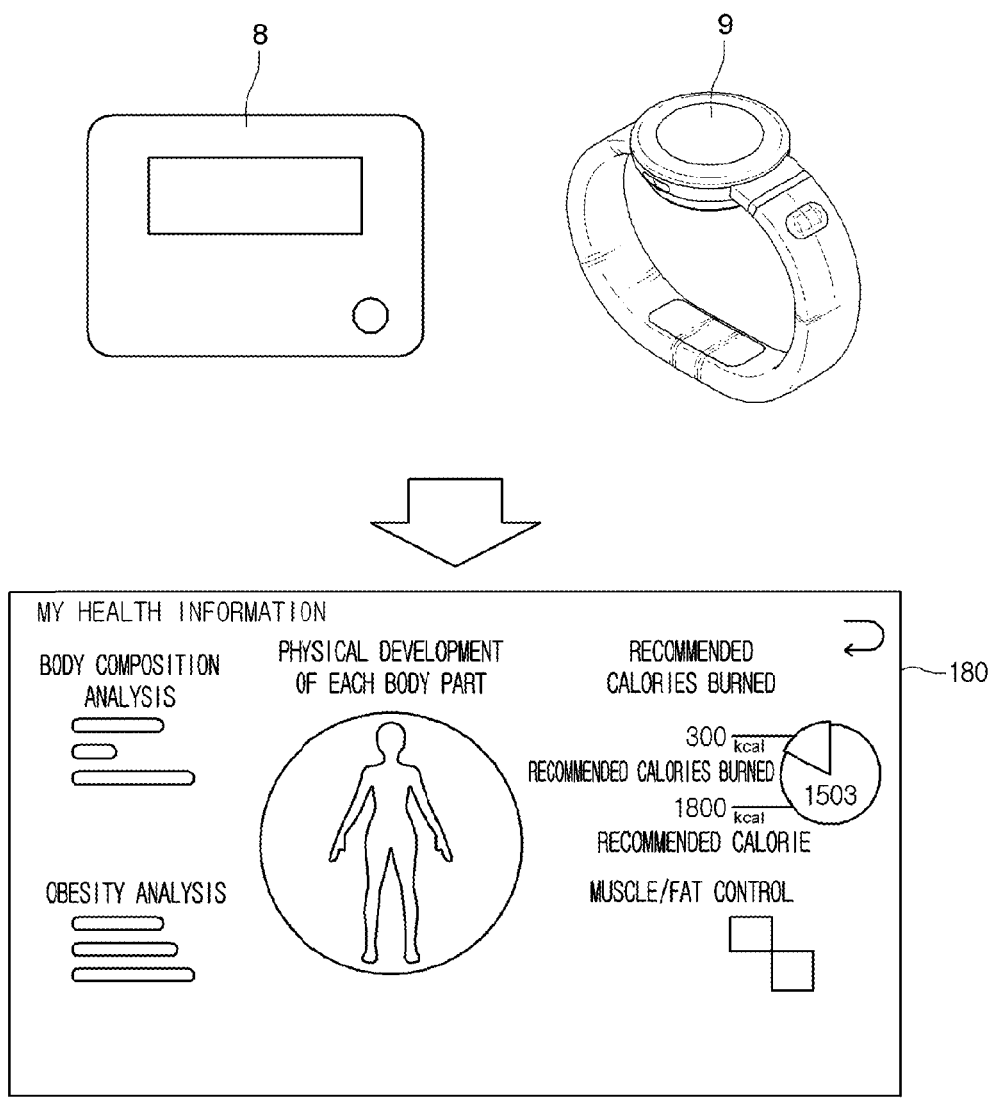

FIG. 26 illustrates an exemplary view that an application related to various exercise information sensing devices capable of sensing user's exercise information is recommended.

Figure 27:
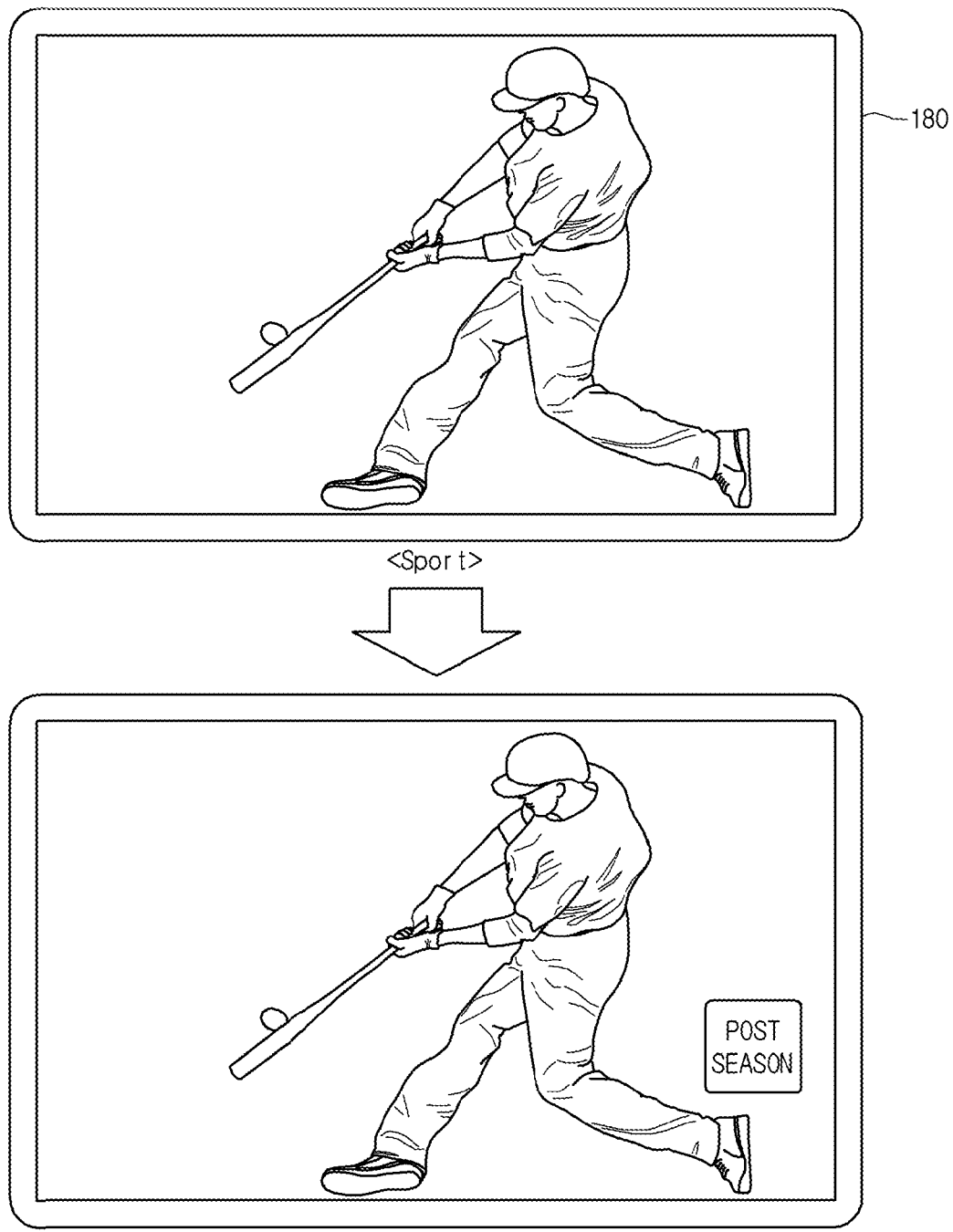

FIG. 27 illustrates an exemplary view for an operation that outputs application information related to sports program among TV programs.

Figure 28:
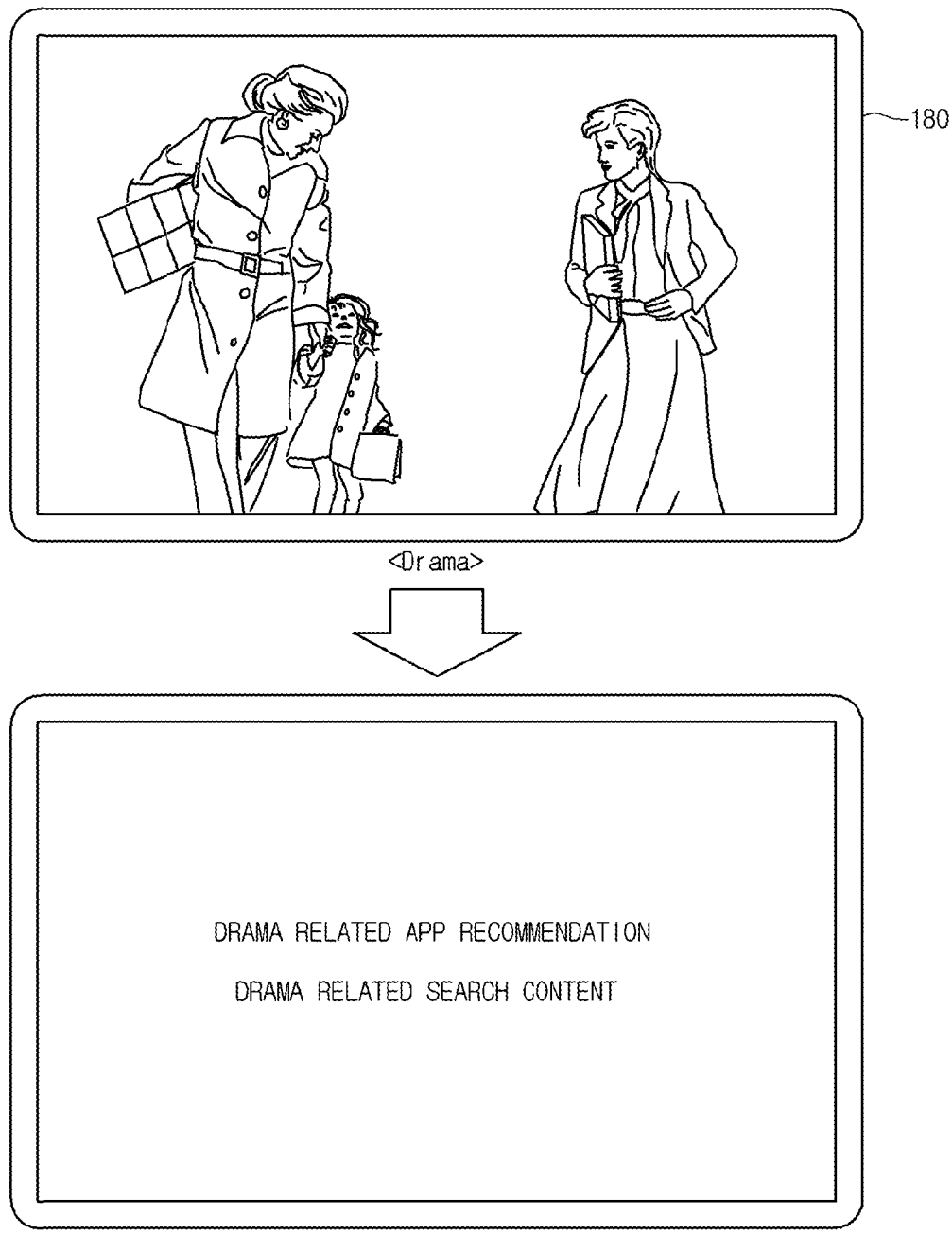

FIG. 28 illustrates an exemplary view for an operation that outputs application information related to drama program among TV programs.

Figure 29:
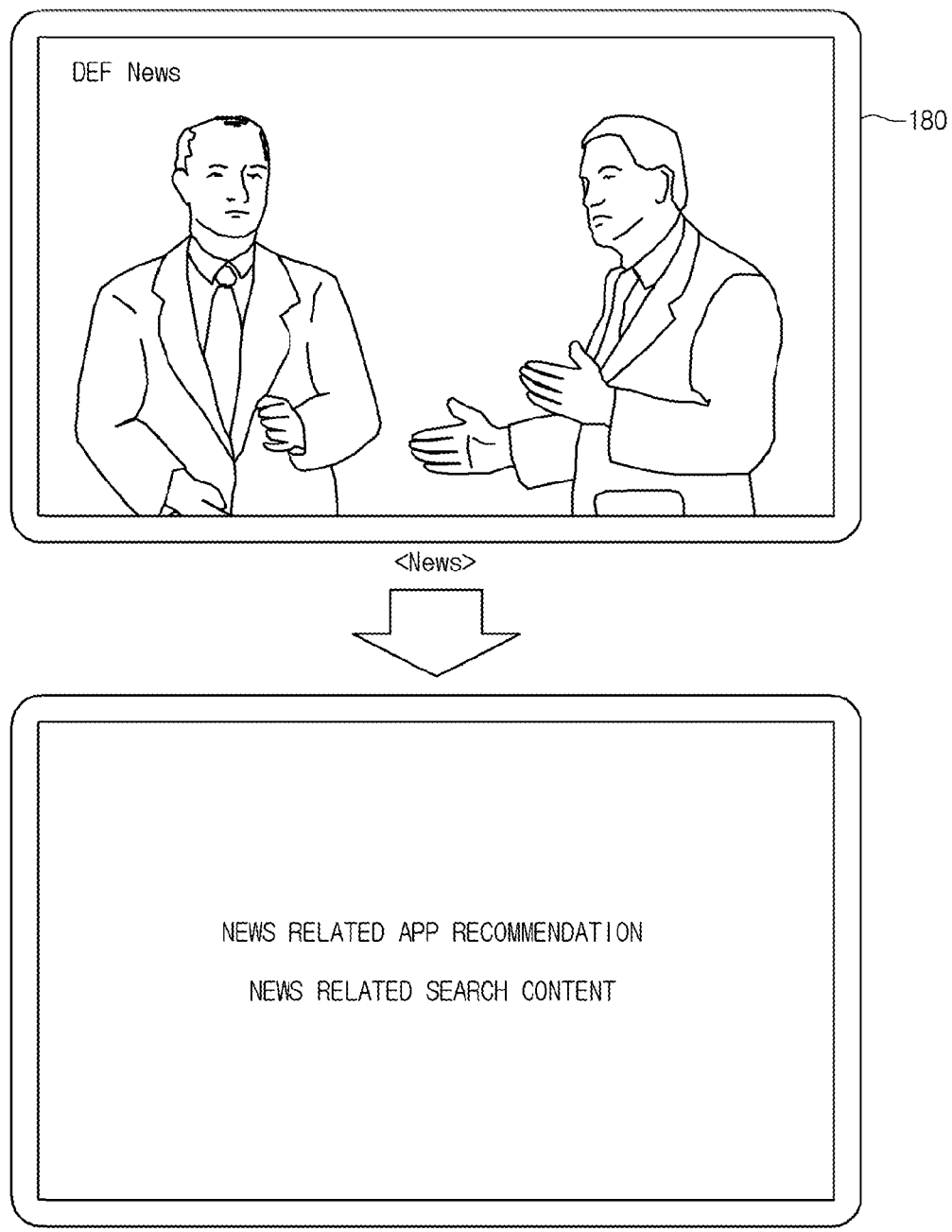

FIG. 29 illustrates an exemplary view for an operation that outputs application information related to news program among TV programs.

Figure 30:
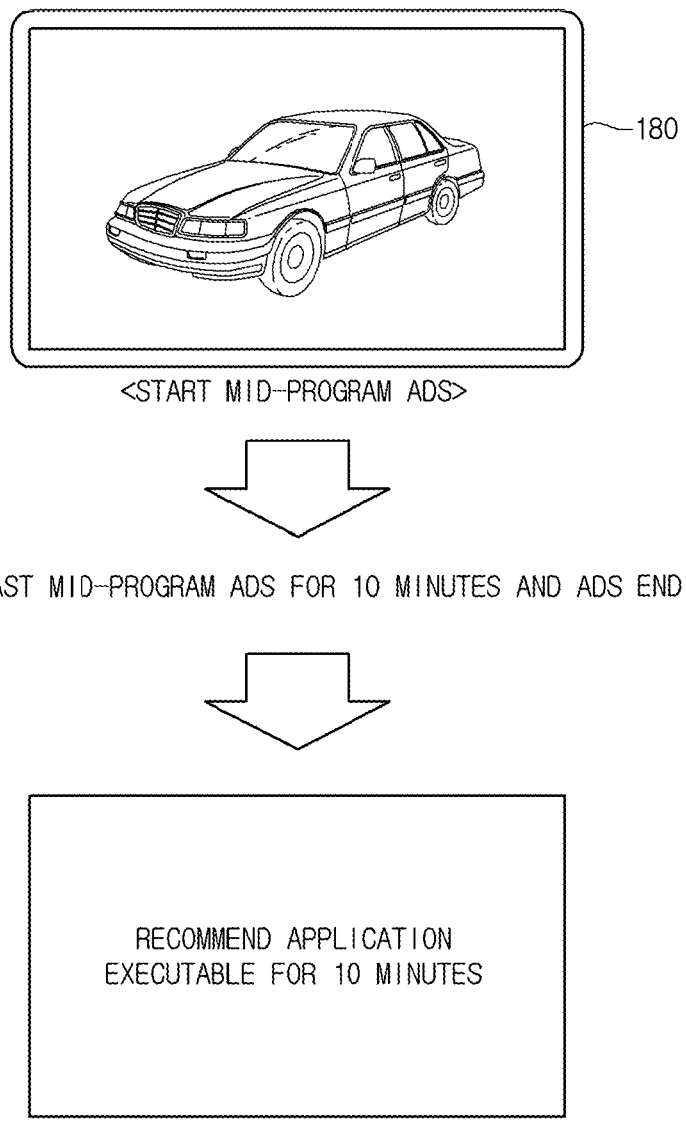

FIG. 30 is a view illustrating an operation of an image display device that obtains, as an event, start of mid-program ads and outputs recommended application information.

Figure 31:
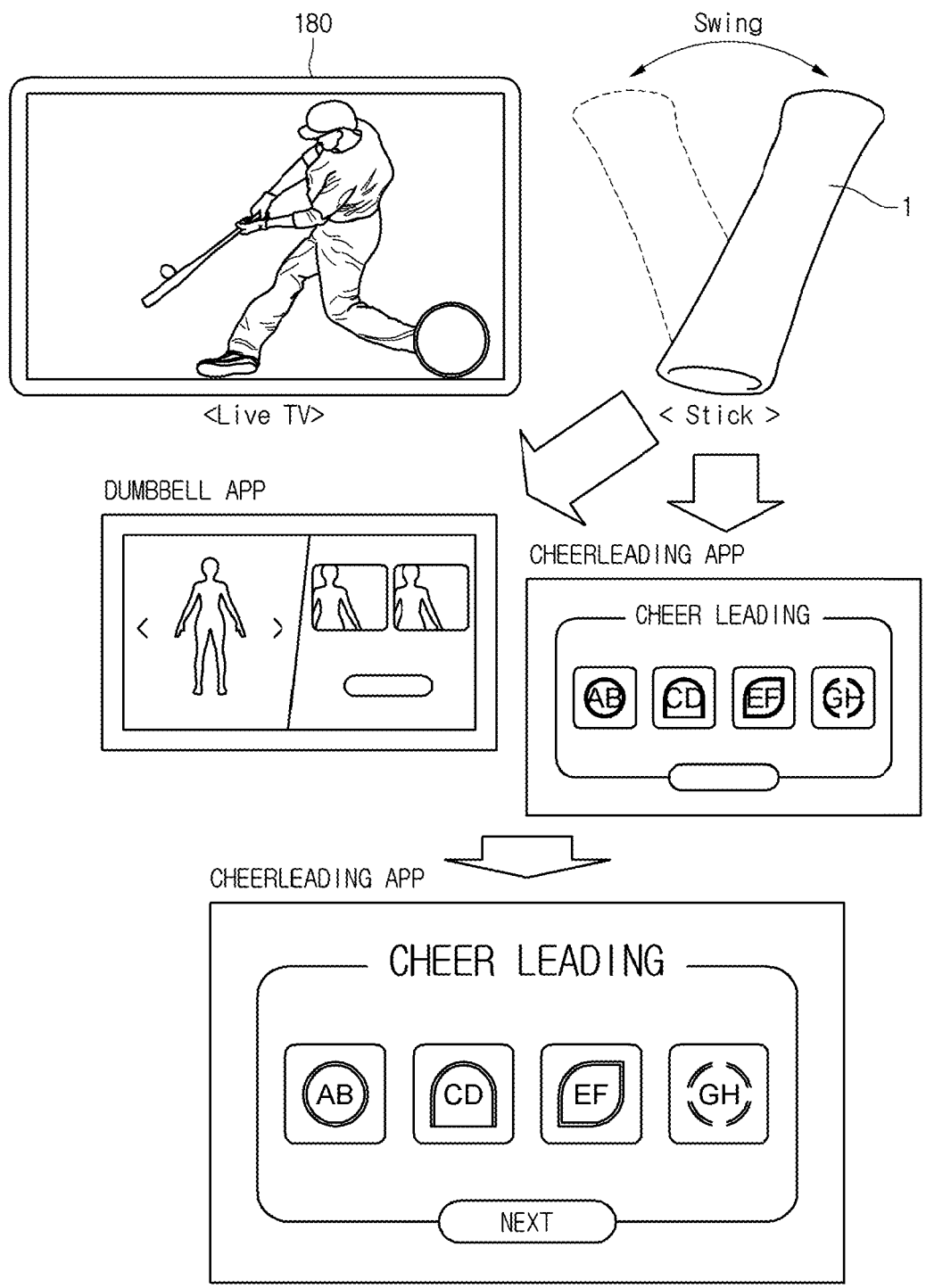

FIG. 31 illustrates an operation method of an image display device when sensing of an interworking device is obtained as an event during displaying a LIVE TV mode.

Figure 32:
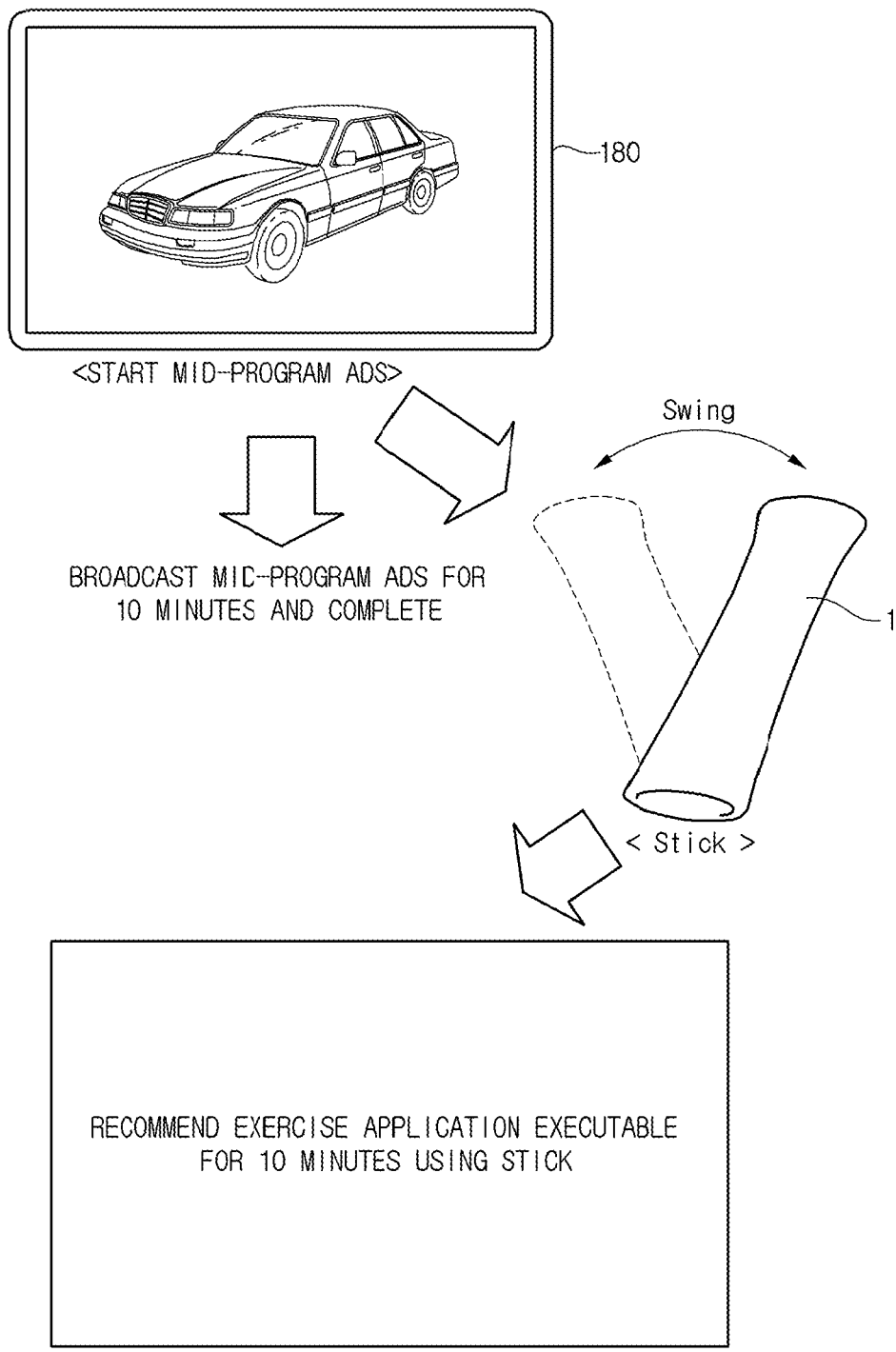

FIG. 32 illustrates an operation method when sensing of an interworking device is obtained as an event during receiving mid-program ads.

Figure 33:
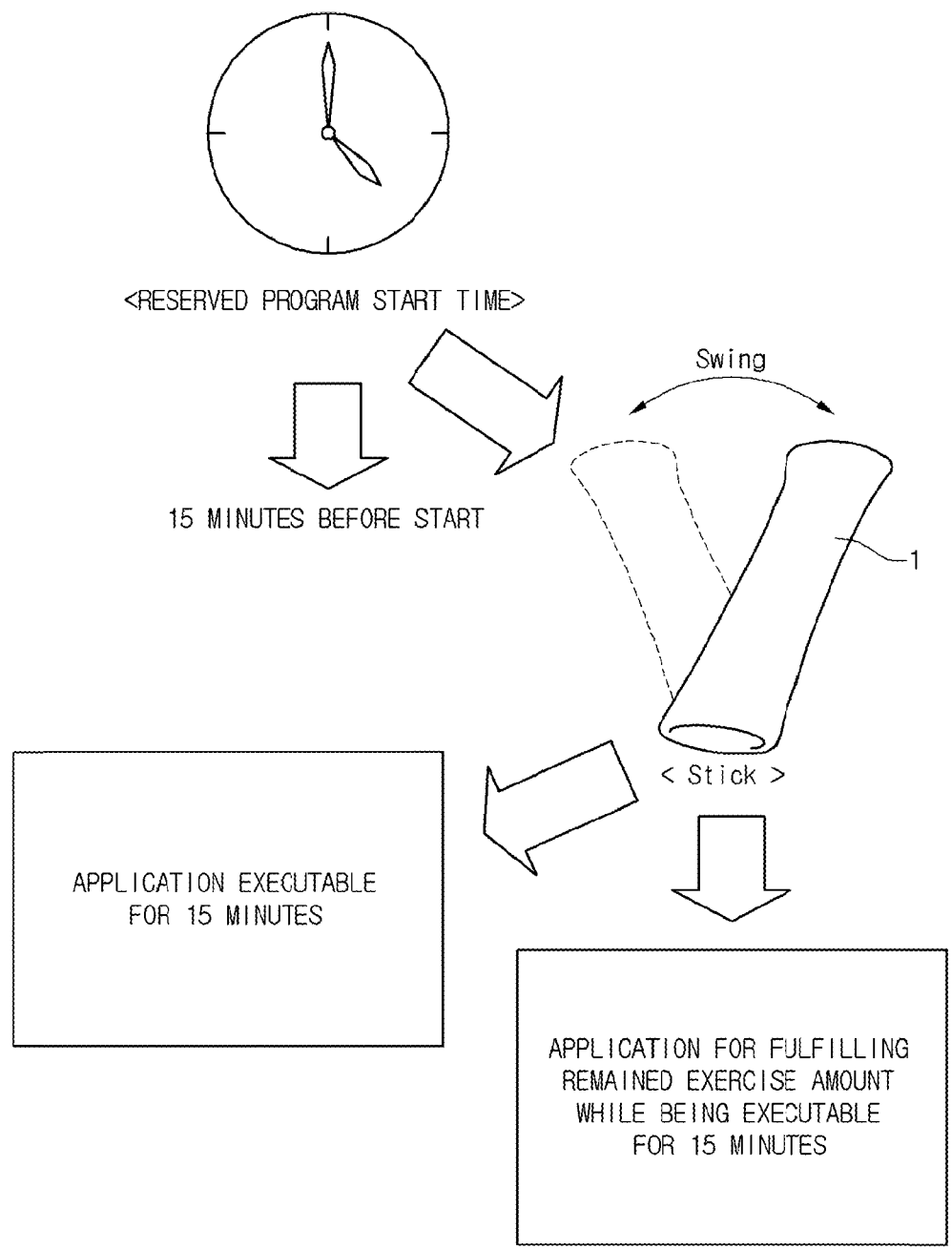

FIG. 33 is a view illustrating the case where an interworking device is sensed before a predetermined time from a start time of a reserved or preferred program during executing an application.

Figure 34:
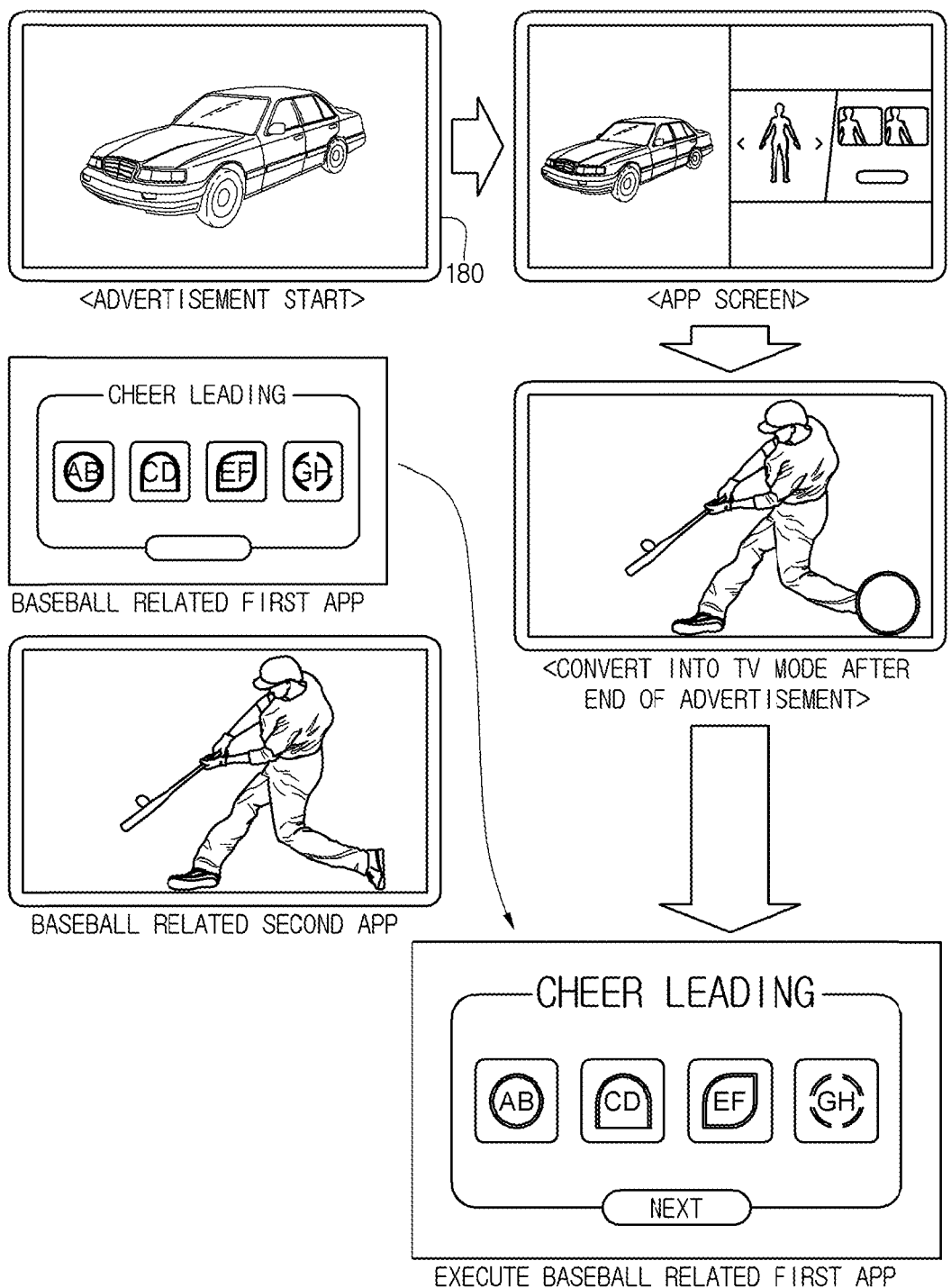

FIG. 34 is a view illustrating an operation method when a LIVE TV mode starts and a TV program is received at the time of completion of mid-program ads when an application is executed during the time of mid-program ads.

FIG. 35 is a view illustrating the case where a predetermined time arrives ahead of a start time of a reserved or preferred program during executing an application.

Figure 36:
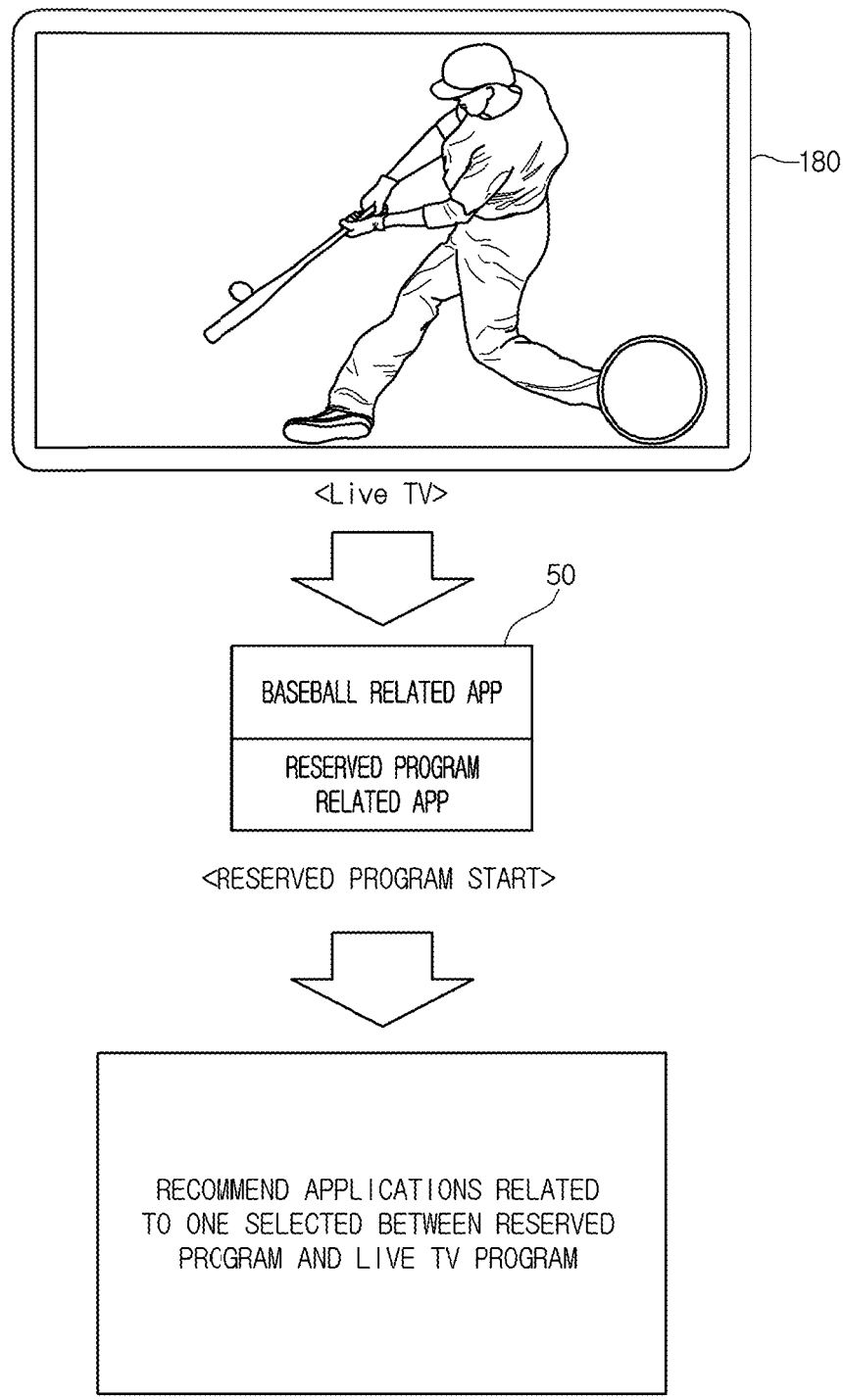

FIG. 36 is a view illustrating the case where a second TV program which is a reserved or preferred program starts during executing a first TV program in a LIVE TV mode.

Figure 37:
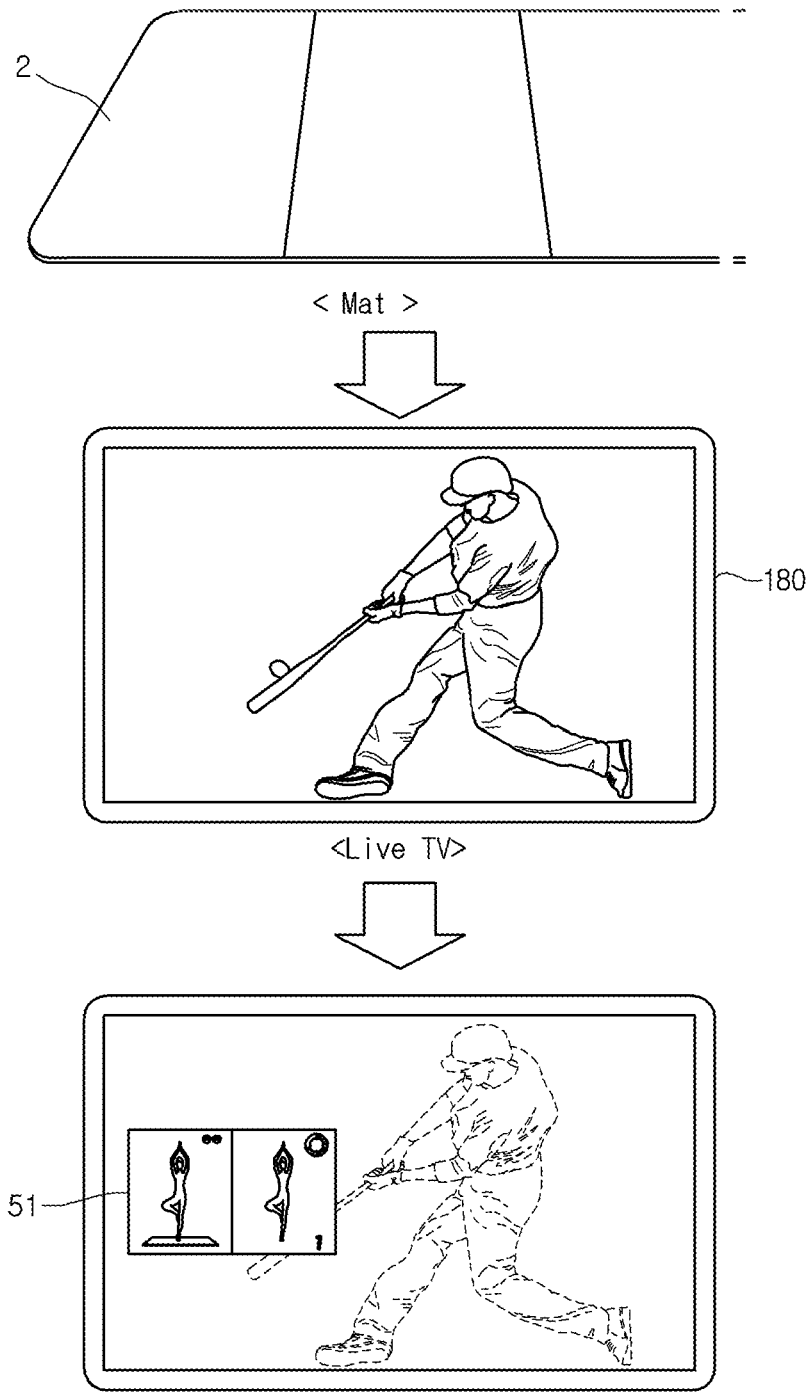

FIG. 37 is an exemplary view, as one method of outputting recommended application information, showing an operation representing an animation of an application to be recommended and a screen that the recommended application is executed when the animation is selected.

Figure 38:
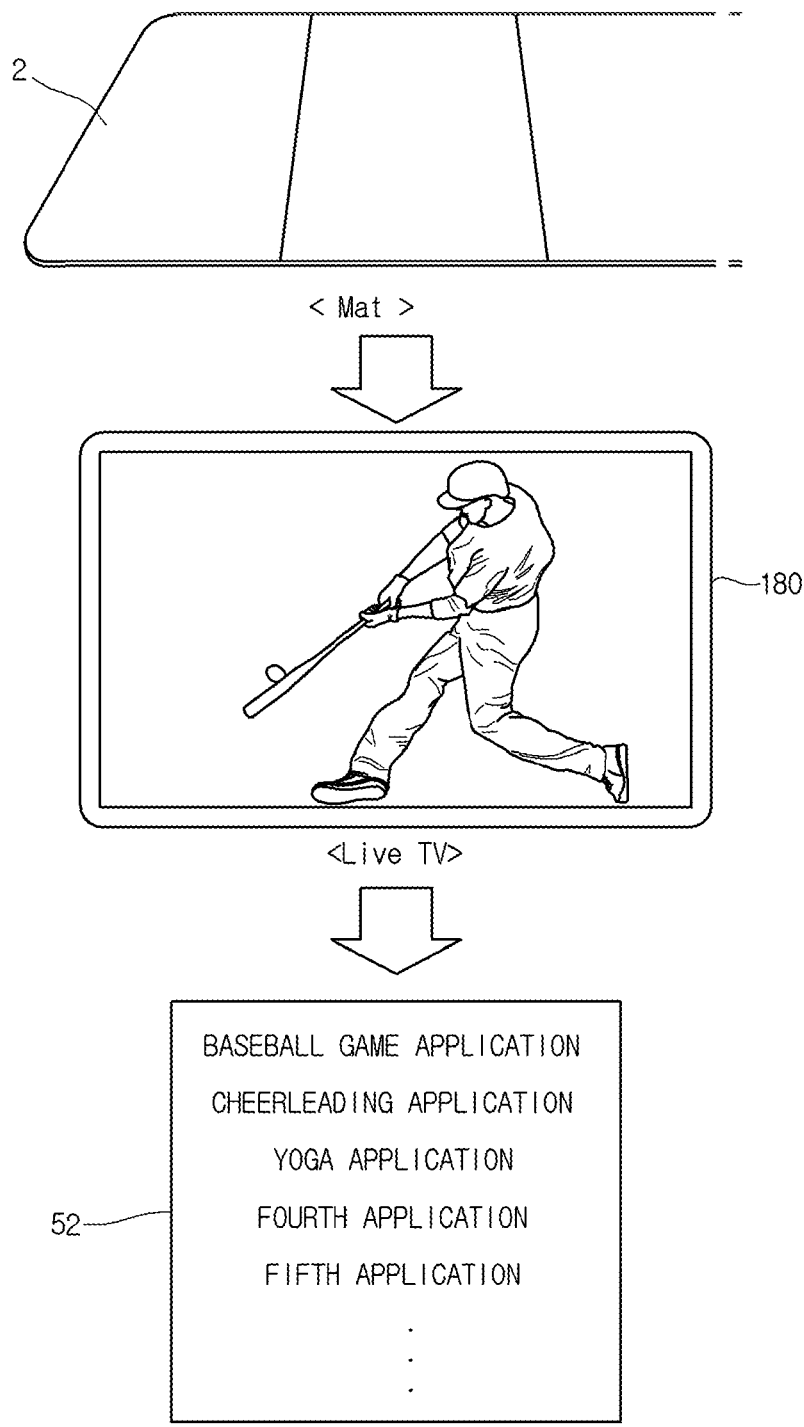

FIG. 38 is an exemplary view, as one method of outputting recommended application information, showing an operation of an image display device that displays a name list of recommended applications and outputs an application corresponding to a selected name.

FIGS. 39 to 43 are exemplary views, as one method of outputting recommended application information, showing operations of an image display device that displays an icon list of recommended applications.

FIGS. 44 to 47 are exemplary views, as other examples of outputting recommended application information, showing the case where an execution screen of a recommended application is displayed.

DETAILED DESCRIPTION OF THE PREFERRED EMBODIMENTS

Reference will now be made in detail to the embodiments of the present disclosure, examples of which are illustrated in the accompanying drawings. In the following description, usage of suffixes such as 'module', 'part' or 'unit' used for referring to elements is given merely to facilitate explanation of the present invention, without having any significant meaning by itself. It should be noted that 'module', 'part', and 'unit' can be substitutively, alternatively or mixedly used.

A screen display control method and an image display device using the same according to an embodiment will be described in detail with reference to the accompanying drawings.

An image display device according to embodiments is an intelligent image display device that, for example, a computer supporting function is added to a broadcast receiving function. The image display device may be equipped with a convenient to use interface such as a written type input device, touch screen, or spatial remote controller due to addition of the internet function while sticking by the broadcast receiving function. In addition, the image display device may also access the internet and a computer by a support of wired or wireless communication, and perform functions of email, web browsing, banking or game. For these various functions, a standardized general purpose OS may be used.

Therefore, an image display device described here may perform various user-friendly functions, because various applications may be freely added to or removed from a kernel of the general purpose OS. The image display device may be, as a detailed example, a network TV, a hybrid broadcast broadband (HBB) TV, a smart TV, an LED TV, or an OLED TV, and may also be applied to a smart phone in some cases.

Figure 1:
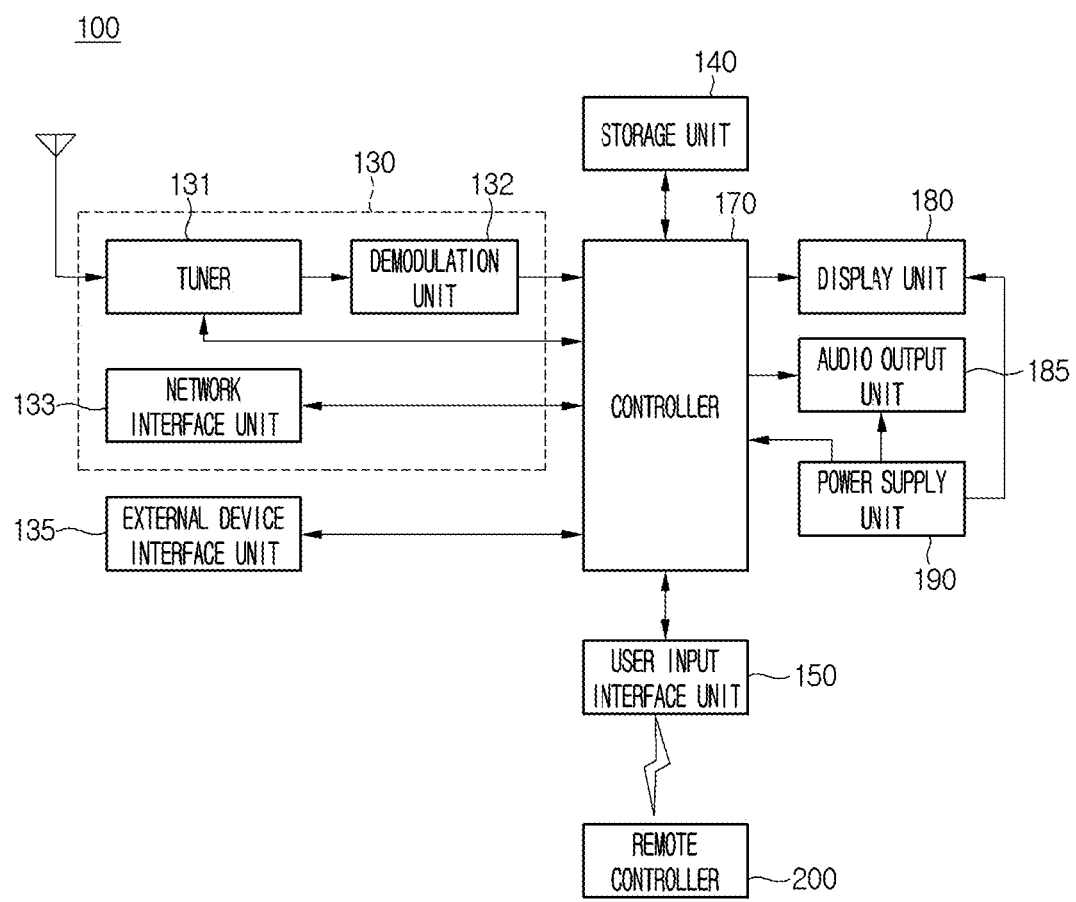
FIG. 1 illustrates a block diagram of a configuration of an image display device according to an embodiment.

FIG. 1 is a block diagram illustrating a configuration of an image display device according to an embodiment.

Referring to FIG. 1, an image display device 100 may include a broadcast receiving unit 130, an external device interface unit 135, a storage unit 140, a user input interface unit 150, a controller 170, a display unit 180, an audio output unit 185, and a power supply unit 190. The broadcast receiving unit 130 may include a tuner 131, a demodulation unit 132, and a network interface unit 133.

The external interface unit 135 may receive an application or an application list in an adjacent external device, and deliver it to the controller 170 or the storage unit 140.

The network interface unit 133 may provide an interface for connecting the image display device to a wired/wireless network including the internet. The network interface unit 133 may transmit or receive data to or from another user or another electronic device through an accessed network or another network linked to the accessed network.

In addition, the network interface unit 133 may transmit some of content data stored in the image display device 100 to a selected user or a selected electronic device among other users or other electronic devices pre-registered for the image display device 100.

The network interface unit 122 may access a certain web page through an accessed network or another network linked to the accessed network. In other words, the network interface unit 122 may access a certain web page through the network and transmit or receive data to or from a corresponding server.

In addition, the network interface unit 133 may receive content or data provided by a content provider or a network operator. In other words, the network interface unit 133 may receive content such as movie, advertisement, game, VOD, broadcast signal and information related thereto provided from the content provider or the network operator through the network.

In addition, the network interface unit 133 may receive firmware update information or update files provided by the network operator, and transmit data to the internet, content provider, or the network operator.

The network interface unit 133 may select and receive desired applications among applications opened in public through the network.

The storage unit 140 may store images, voices, or data signals stored and signal-processed by programs for signal-processing and controlling in the controller 170.

In addition, the storage unit 140 may perform a function of temporarily storing images, voices, or data signals input from the external interface unit 135 or the network interface unit 133, and may store information on images through a channel memory function.

The storage unit 140 may store an application or an application list input from the external interface unit 135 or the network interface unit 133.

The image display device 100 may play, to the user, content files (a video file, a still image file, a music file, a document file, an application file, etc.) stored in the storage unit 140.

The user input interface unit 150 may deliver a signal input by the user to the controller 170, or deliver a signal from the controller 170 to the user. For example, the user input interface unit 150 may receive and process a control signal such as power on/off, channel selection, or screen setting from the remote controller 200, or transmits a control signal from the controller 170 to the remote controller 200 according to various communication schemes such as Bluetooth, ultra wideband (WB), ZigBee, radio frequency (RF) communication, and infrared (IR) communication.

In addition, the user input interface unit 150 may deliver a control signal input through a power key, a channel key, a volume key, or a local key (not shown) for a setting value, etc.

An image signal image-processed by the controller 170 may be input to the display unit 180 and displayed as an image corresponding to the corresponding image signal. In addition, the image signal image-processed by the controller 170 may be input to an external output unit through the external device interface unit 135.

A voice signal processed by the controller 170 may be audio-output to the audio output unit 185. In addition, the voice signal processed by the controller 170 may also be input to the external output device through the external device interface unit 135.

In addition, the controller 170 may control overall operation in the image display device 100.

The controller 170 may also control the image display device 100 by means of user commands input through the user input interface unit 150 or internal programs, and access a network and allow the user to download a desired application or application list to the image display device 100.

The controller 170 may allow user-selected channel information to be output together with the processed image or voice signal through the display unit 180 or the audio output unit 185.

In addition, the controller 170 may allow an image signal or a voice signal input through the external device interface unit 135 from an external device, for example, a camera or a camcorder to be output to the display unit 180 or the audio output unit 185 according to an external device image playback command received through the user input interface unit 150.

On the other hand, the controller 170 may control the display unit 180 so as to display an image, and control so that a broadcast image input through the tuner 131, an external input image input through the external interface unit 135, an image input through the network interface unit, or an image stored in the storage unit 140 is displayed on the display unit 180. In this case, the image displayed on the display unit 180 may be a still image or a video, or a 2-dimensional (2D) or 3-dimensional (3D) image.

The controller 170 may also control so that content stored in the image display device 100, received content, or externally input content is played, and the content may have various types including a broadcast image, an externally input image, an audio file, a still image, an accessed web screen, and a document file.

The display unit 180 may convert an image signal, a data signal, or an OSD signal processed by the controller 170, or an image signal, or a data signal received by the external device interface unit 135 into an RGB signal, and generate a driving signal.

On the other hand, the image display device 100 illustrated in FIG. 1 is merely an embodiment, and some of the illustrated elements may be integrated, added or omitted according to specification of the actually implemented image display device 100.

In other words, in some cases, two or more elements may be integrated into one element, or one element may be divided into two or more elements. In addition, a function performed by each block is for explaining an embodiment, and detailed operations or devices thereof are not limit the scope of the present invention.

According to another embodiment, the image display device 100 may receive an image through the network interface unit 133 or the external device interface 135 and play the image without including the tuner 131 and the demodulation unit 132, which is different from as shown in FIG. 1.

For example, the image display device 100 may be implemented as divided into an image processing device such as a set top box for receiving a broadcast signal or contents according to various network service, and a content playing device playing contents input from the image processing device.

In this case, an image displaying method according to an embodiment to be described below may be executed by not only the image display device 100 as described above with reference to FIG. 1, but also the image processing device such as the divided set top box or content playing device including the display unit 180 and audio output unit 185.

Next, a remote controller according to an embodiment is described with reference to FIGS. 2 and 3.

Figure 2:
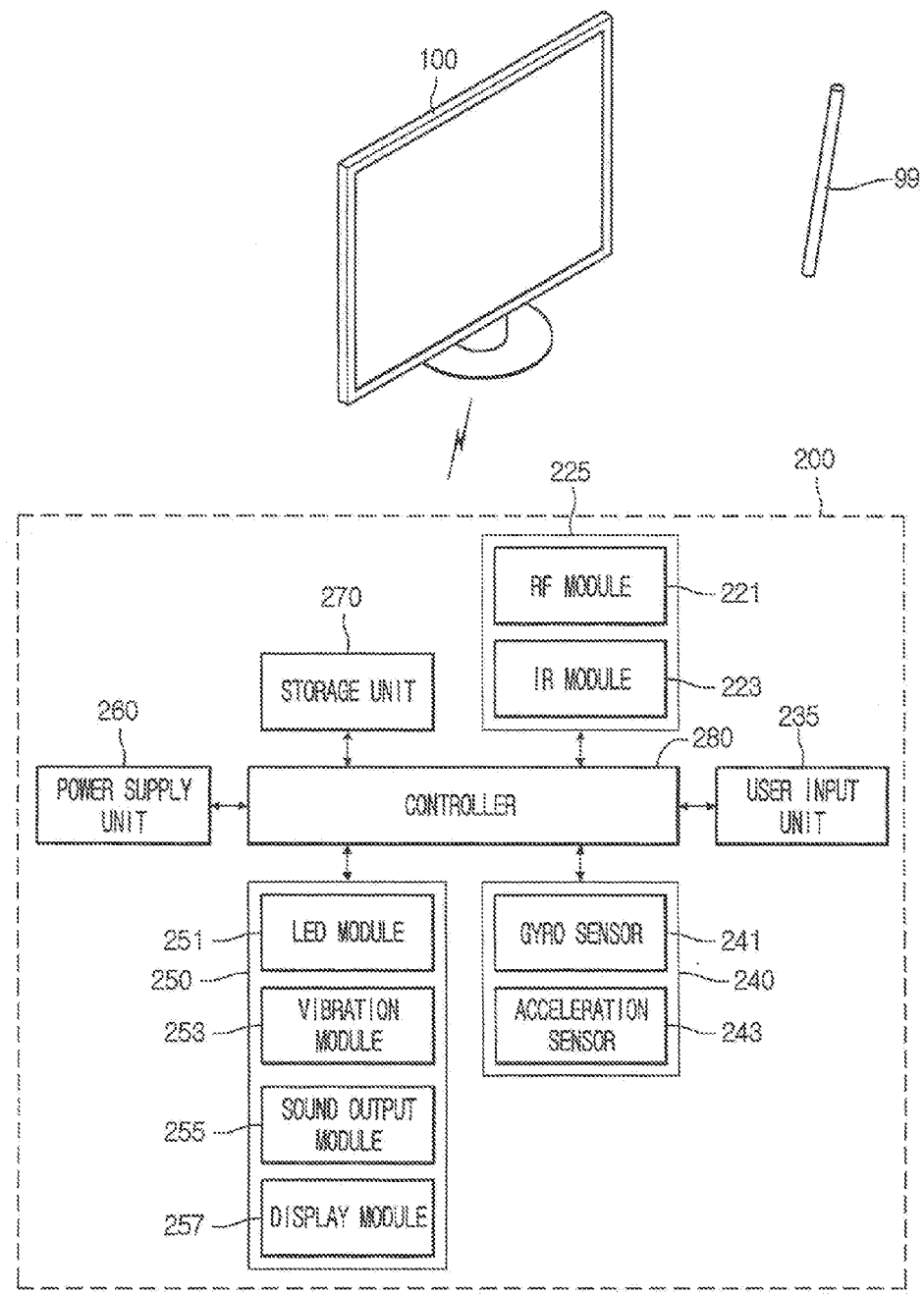
FIG. 2 illustrates a block diagram of a remote controller and an interworking device according to an embodiment.
Figure 3:
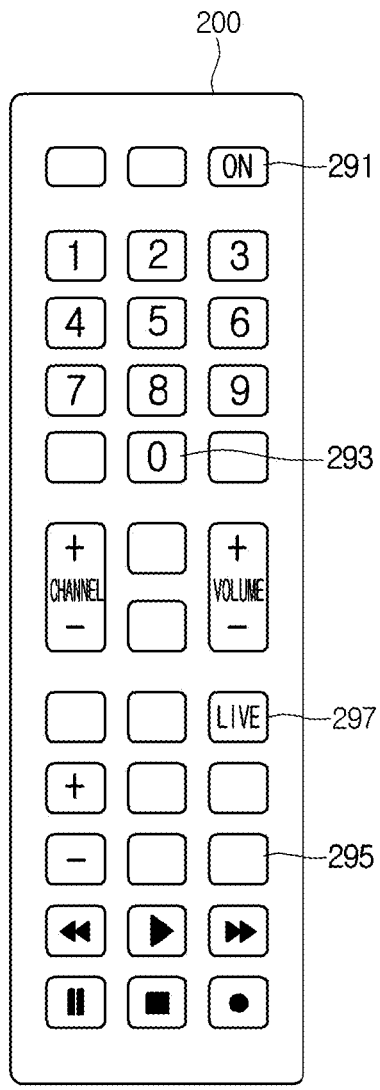
FIG. 3 illustrates an exemplary configuration of a remote controller according to an embodiment.

FIG. 2 is a block diagram illustrating a remote controller and an interworking device, and FIG. 3 illustrates an exemplary configuration of a remote controller according to an embodiment.

First, as illustrated in FIG. 2, the remote controller 200 may include a wireless communication unit 225, a user input unit 235, a sensor unit 240, an output unit 250, a power supply unit 20, a storage unit 270, and a controller 280.

As illustrated in FIG. 2, the wireless communication unit 225 transmits and receives a signal with any one of the above-described image display devices.

The remoter controller 200 may include an RF module 221 that is capable of transmitting and receiving a signal with the image display device 100 according to RF communication specification, and include an IR module 223 that is capable of transmitting and receiving a signal with the image display device 100 according to IR communication specification.

In addition, the remote controller 200 may transmit a signal having information on movement of the remote controller 200 therein to the image display device 100 through the RF module 221.

Furthermore, the remote controller 200 may receive a signal transmitted by the image display device 100 through the RF module 221, and transmit a command such as power on/off, channel change, or volume change to the image display device 100 through the IR module 223 in some cases.

The user input unit 235 may include a keypad, buttons, a touch pad, or a touch screen, etc. The user may manipulate the user input unit 235 and input commands related to the image display device 100 to the remote controller 235. When the user input unit 235 includes a hard key button, the user may input commands related to the image display device 100 to the remote controller 200 through a push operation to the hard key button. Regarding this, description is made with reference to FIG. 3.

Furthermore, the interworking device 99 shown in FIG. 2 indicates an external device interworking with the image display device of the embodiment and includes, but not limited to, both of a user's health information sensing device and a user's body information sensing device.

As illustrated in FIG. 3, the remote controller 200 may include a plurality of buttons. The plurality of buttons may include a power button 291, a channel button 293, an emotion mode button 295 and a LIVE button 297.

The power button 291 may be a button for turning on/off power of the image display device 100.

The channel button 293 may be a button for receiving a broadcast signal of a specific broadcast channel.

The emotion mode button 295 may be a button for entering an emotion mode to be described later.

The LIVE button 297 may be a button for displaying a broadcast program in real time.

Description is made with reference to FIG. 2 again.

When the user input unit 235 includes a touch screen, the user may input commands related to the image display device 100 to the remote controller 200 by touching soft keys on the touch screen. In addition, the user input unit 235 may include various kinds of input units operable by the user including a scroll key or a jog key, etc., and the embodiment does not limit the scope of the present invention.

The sensor unit 240 may include a gyro sensor 241 or an acceleration sensor 243, and the gyro sensor 241 may sense information on movement of the remote controller 200.

For example, the gyro sensor 241 may sense information on the movement of the remote controller 200 on the basis of x, y, z axes, and the acceleration sensor 243 may sense information on a movement speed of the remote controller 200. In addition, the remote controller 200 may further include a distance measuring sensor and sense a distance to the display unit 180 of the image display device 100.

The output unit 250 may output images or voice signals corresponding to manipulation of the user input unit 235 or corresponding to a signal transmitted by the image display device 100. Through the output unit 250, the user may recognize whether the user input unit 235 is manipulated or whether the image display device 100 is controlled.

For example, the output unit 250 may include an LED module 251 turned on, a vibration module 253 generating vibration, a sound output module 255 outputting a sound, or a display module 257 outputting an image, when the user input unit 235 is manipulated or signals are transmitted and received with the image display device 100 through the wireless communication unit 225.

In addition, the power supply unit 260 supplies power to the remote controller 200. When the remote controller 200 is not moved for a predetermined time, the power supply unit 260 stops supplying power to the remote controller 200 and may reduce power waste. The power supply unit 260 may resume supplying power when a certain key prepared in the remote controller 200 is manipulated.

The storage unit 270 may store various kinds of programs necessary for controlling or operating the remote controller 200 or application data. When the remote controller 200 wirelessly transmits and receives signals with the image display device 100 through the RF module 221, the remote controller 200 and the image display device 100 transmit and receive signals through a certain frequency band.

The controller 280 of the remote controller 200 may store, in the storage unit 270, and refer to information on a frequency band through which signals are wirelessly transmitted and received with the image display device 100 paired with the remote controller 200.

The controller 280 controls overall items related to controls of the remote controller 200. The controller 280 may transmit, to the image display device 100 through the wireless communication unit 225, signals corresponding to manipulation of a certain key of the user input unit 235 or corresponding to the movement of the remote controller 200, which is sensed by the sensor unit 240.

An operation method of the image display device 100 according to an embodiment is described with reference to FIGS. 4 to 7.

Hereinafter, "recommend an application", or "recommend a related application" may be used as having the same meaning as "output recommended application information".

Figure 4:
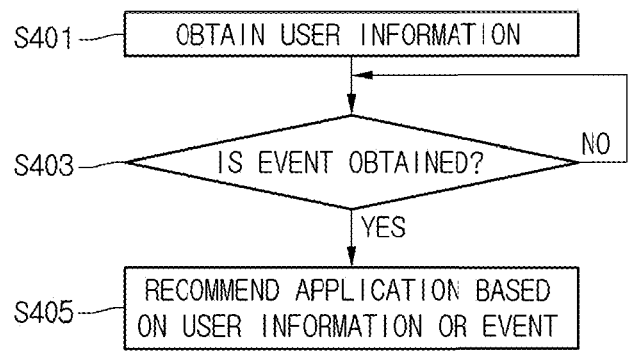
FIG. 4 illustrates a flowchart of an operation method of an image display device according to an embodiment.

FIG. 4 is a flowchart illustrating an operation method of the image display device 100 according to an embodiment of the present invention.

As illustrated in FIG. 4, the controller 170 obtains user information through the user interface unit 150 (operation S401).

The user information may include user's health information. The user's health information includes, but not limited to, user's body information and user's exercise amount information.

The user's body information may include weight, height, fat mass, caloric intake, blood pressure, pulse, whether to have a disease, and/or whether to have an injury. The user's exercise amount information may include, but not limited to, a total target amount of exercise, a remaining target amount of exercise and/or an amount of exercise done by the user.

A method that the controller 170 obtains user's information may include, but not limited to, a method of obtaining the user's information through user's input by using the user interface 150. The controller 170 accesses the interworking device 99 or an external input device (not shown) through the user interface unit 150 and obtains the input of the user information.

As shown in FIG. 4, the controller 170 obtains the user information and then determines whether an event is obtained (operation S403).

Figure 6:
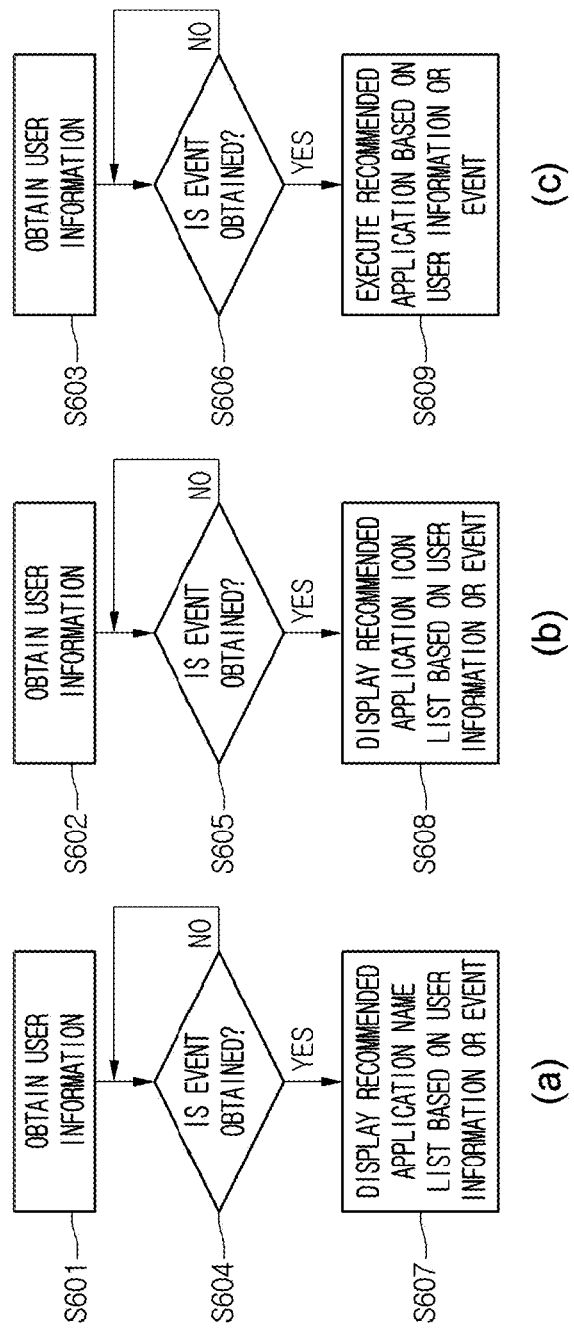
FIG. 6 illustrates flowcharts of operation methods of an image display device according to other embodiments.
Figure 7:
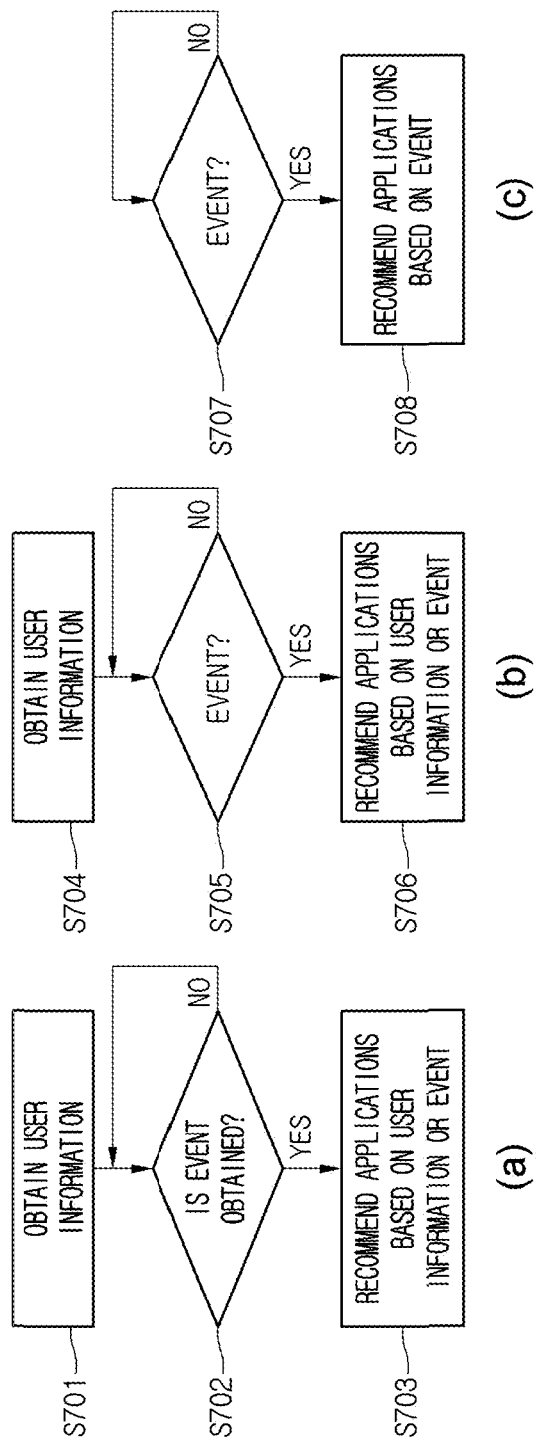
FIG. 7 illustrates flowcharts of operation methods of an image display device according to other embodiments.

As shown in FIG. 6, the event is firstly obtained and then the user information may be obtained.

Figure 5:
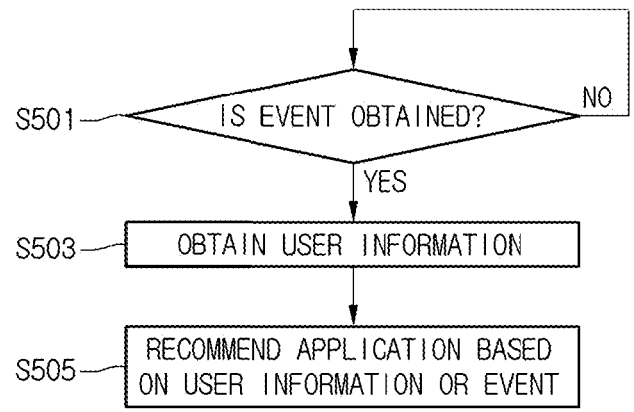
FIG. 5 illustrates a flowchart of an operation method of an image display device according to another embodiment.

In other words, the controller 170 obtains the user information as shown in FIG. 4, and then obtains the event. Alternatively, after obtaining the event and then the user information (operations S501 and s503), the controller 170 may recommend an application (operation S505) as shown in FIG. 5. However, it is not limited hereto.

Hereinafter, the event is described in detail.

An example of the event may include the case where the interworking device 99 interworks with the image display device 100 in a state where power of the image display device 100 is turned on.

Another example of the event may include the case where the interworking device 99 interworks with the image display device 100 during receiving a LIVE TV signal in the image display device 100. The reception of the LIVE TV signal may indicate that a corresponding image is played on the image display device 100 in a state of power on.

An example of the interworking device 99 may include a health management device (or exercise auxiliary device) related to a health management application. An example of the health management device may include, but not limited to, a stick 1, a mat 2, a shoe 3, a bicycle 4, a blood pressure monitor 5, a weighing scale 6, a thermometer 7, a pedometer 8, and/or a life-band.

Another example of the interworking device 99 may include a wearable glass, a wearable watch, a smart phone, and smart tablet equipment related to a health management application.

Another example of an event may include a case where a LIVE TV signal is received after reception of a mid-program ad signal is completed.

Another example of an event may include a case where a signal of a view-reserved program is received in a state where power of the image display device 100 is turned on.

Another example of an event may include a case where a preset preferred program signal is received in a state where power of the image display device 100 is turned on.

Another example of an event may include a case where a user's gesture obtained by the camera 10 connected to the image display device 100.

Another example of an event may include a user's voice signal obtained through a microphone connected to the image display device 100.

As illustrated in FIG. 4, when an event is obtained, the controller 170 may output recommended application information on the display unit 180 on the basis of obtained user information or the event (operation S405).

The controller 170 may output the recommended application information on the basis of the obtained user information or event, or output the recommended application information on the basis of both the obtained user information and event. However, it is not limited hereto.

The recommend application information may include, but not limited to, a recommended application name list, a recommended application icon list and/or a recommended application execution screen.

FIGS. 6a to 6c are flowcharts illustrating an operation method of the image display device 100 according to other embodiments.

As illustrated in FIG. 6a, when user information is obtained and then an event is obtained (operations S601, S604), the controller 170 may display a recommended application name list (operation S607).

As illustrated in FIG. 6b, when user information is obtained and then an event is obtained (operations S602, S605), the controller 170 may display a recommend application icon list (operation S608).

As illustrated in FIG. 6c, when user information is obtained and then an event is obtained (operations S603, S606), the controller 170 may display, but not limited to, a recommended application execution screen (operation S609).

FIGS. 7a to 7c are flowcharts illustrating an operation method of the image display device 100 according to other embodiments.

As illustrated in FIG. 7a, when the user information and event are obtained (S701, S702), the controller 170 may recommend an application on the basis of the user information and event (operation S703).

As illustrated in FIG. 7b, when the user information and event are obtained (S704, S705), the controller 170 may recommend an application on the basis of the user information (operation S706).

As illustrated in FIG. 7c, when the event is obtained (S707), the controller 170 may recommend an application on the basis of, but not limited to, the event (operation S708).

Hereinafter, referring to FIGS. 8a to 17, description is made about an event obtaining method which is a basis of an operation of outputting recommended application information on the display unit 180.

FIGS. 8a to 14 are views representing an operation of sensing the interworking device 99 as an example of an event according to an embodiment.

The interworking device 99 described below may include communication units 101, 201, 301, and 401, and sensing units 102, 202, 302, and 403. The communication units 101, 201, 301, and 401 in the interworking device 99 may transmit and receive communication signals with the network interface unit 133 in the image display device 100, and in particular, transmit a sensing signal to the network interface unit 133 in the image display device 100.

As an example that the image display device 100 obtains an event, there is a method of sensing a movement (acceleration movement or uniform velocity movement) through the sensing units 102, 202, 302, and 402.

As another example that the image display device 100 obtains an event, there is a method that the image display device 100 receives an input signal input to the interworking device 99 and obtains an event.

As illustrated in FIG. 8a, an example of the interworking device 99 may include a stick 1.

The stick 1 may mean a moveable rod. The stick 1 is moveable back and forth and right and left based on a longitudinal direction of the stick 1, and also moveable in the longitudinal direction, but is not limited hereto.

As illustrated in FIG. 8b, the stick 1 may include the communication unit 101 and the sensing unit 102.

The sensing unit 102 may include a gyro sensor or an acceleration sensor. A method that the controller 170 of the image display device 100 obtains information on movement of the stick 1 through the gyro sensor or the acceleration sensor is identical to an operation of each sensor, and therefore detailed description thereabout is omitted.

The sensing unit 102 of the stick 1 may sense movement (or acceleration) of the stick 1 and generate a movement signal. The communication unit 101 of the stick 1 may transmit the generated movement signal to the image display device 100.

The controller 170 of the image display device may output recommended application information related to the stick 1 on the basis of the movement signal of the stick 1, which is obtained from the movement of the stick 1.

An example of the recommended application related to the stick 1 may include an exercise application that receives an input signal through the stick 1 and is driven on the basis of the input signal received through the stick 1. An example of the exercise application related to the stick 1 may include an exercise application using dumbbells or an exercise application requiring a motion from the user to clench his/her fist. The exercise application related to the stick 1 includes, but not limited to, an application or an exercise related application driven through the stick 1.

As shown in FIG. 9a, another example of the interworking device 99 includes a mat 2.

An exemplary type of the mat 2 may include, but not limited to, a rectangular, circular or regular polygon type. A material of the mat 2 may include, but not limited to, a plastic or a metal.

As shown in FIG. 9b, the mat 2 may include the communication unit 201 and the sensing unit 202.

The sensing unit 202 in the mat 2 may sense pressure applied to the mat 2 and generate a mat pressure signal. The communication unit 201 in the mat 2 may transmit the mat pressure signal generated by the sensing unit 202 to the image display device 100.

The controller 170 in the image display device 100 may output recommended application information related to the mat 2 on the basis of the mat pressure signal transmitted to the image display device 100 from the mat 2.

The recommended application related to the mat 2 may include one or more applications driven by using the mat 2.

An example of the application using the mat 2 may include, but not limited to, an exercise application requiring a motion done by the user standing on two legs or one leg on the mat 2 or a motion done by the user sitting down on the mat 2.

As illustrated in FIG. 10a, another example of the interworking device 99 may include a shoe 3.

An example of a kind of the shoe 3 may include, but not limited to, a sneaker or a slipper.

As illustrated in FIG. 9b, the shoe 3 may include the communication unit 301 and the sensing unit 302.

The sensing unit 302 in the shoe 3 senses pressure through the sole of the shoe 3 and generates a shoe pressure signal. The communication unit 301 in the shoe 3 may transmit the shoe pressure signal generated in the sensing unit 302 to the image display device 100.

The controller 170 in the image display device 100 may output recommended application information driven by using the shoe 3 on the basis of the shoe pressure signal transmitted from the shoe 3.

The recommended application driven by using the shoe 3 may include all exercise applications requiring a motion performable in a state where the user wears the shoe 3. Examples thereof may include, but not limited to, a running exercise application, a walking exercise application and a jumping rope exercise application.

As illustrated in FIG. 11a, another example of the interworking device 99 includes a bicycle 4.

The bicycle 4 may include pedals through which a rotation input of the user is obtainable and wheels accelerated by the rotation input.

As shown in FIG. 11b, the bicycle 4 may include the communication unit and the sensing unit 402.

The sensing unit 402 in the bicycle 4 may sense a rotation input applied to the pedals and generate a rotation signal. The communication unit 401 in the bicycle 4 may transmit the generated rotation signal to the image display device 100.

The controller 170 in the image display device 100 may output recommended application information driven by using the bicycle 4 on the basis of the rotation signal transmitted from the bicycle 4 to the image display device 100.

The recommended application driven by using the bicycle 4 may include all applications using the bicycle 4. One example of the application using the bicycle 4 may include, but not limited to, an exercise application requiring a motion that the user rotates the pedals of the bicycle 4.

As illustrated in FIG. 12, the interworking device 99 may include body information sensing devices 5, 6, and 7. The body information sensing devices may include the blood pressure monitor 5 (FIG. 12a), the weighing scale 6 (FIG. 12b), the thermometer 7 (FIG. 12c), and a body fat scale (not shown). The body information sensing devices 5, 6, and 7 may sense health information on the user and generate a body information signal.

Each of the body information sensing devices 5, 6, and 7 may transmit the sensed body information signal to the image display device 100 and the controller 170 of the image display device 100 may output information on a health information application for outputting body information on the basis of the received body information signal.

As illustrated in FIG. 13, other examples of the interworking device 99 include exercise information sensing devices 8 and 9.

The exercise information sensing devices 8 and 9 may include the pedometer 8 (FIG. 13a), the wearable watch and the life-band 9 (FIG. 13b). The exercise information sensing device may sense exercise information on the user through an exercise information sensing unit (not shown).

Each of the exercise information sensing devices 8 and 9 may transmit the sensed exercise information to the image display device 100 and the controller 170 of the image display device 100 may output an exercise information application for outputting performed exercise amount information or necessary exercise amount information on the basis of the transmitted exercise information, and at least one piece of exercise application information for fulfilling a necessary exercise amount on the basis of the necessary exercise amount.

Figure 14:
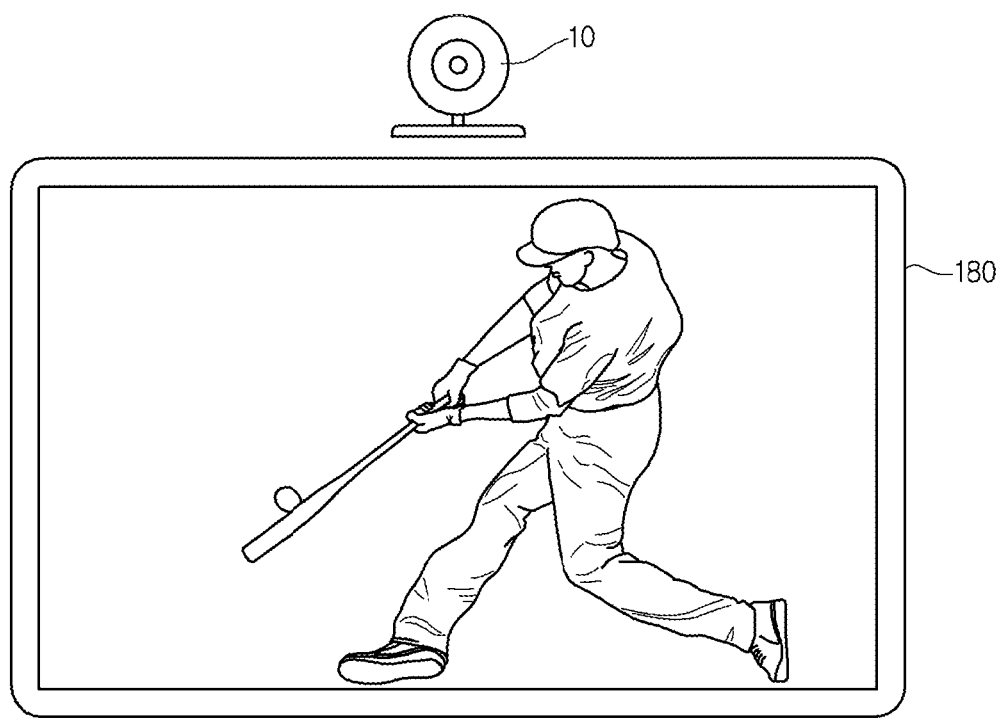

As illustrated in FIG. 14, the camera 10 connected to the image display device 100 may capture a gesture and transmit the captured gesture to the controller 170 of the image display device 100.

The gesture may include, but not limited to, an arm motion, a hand motion, a leg motion, a finger motion, and a face change.

The controller 170 recognizes the captured gesture and determines whether the capture gesture is included in pre-set events. As the determined result, when the gesture is included in the preset event, the controller 170 may output recommended application information corresponding to the capture gesture on the basis of the capture gesture. The correspondence between the gesture and the recommended application may be set by the user, but is not limited hereto.

As an example of the correspondence between the gesture and the application, the walking gesture may correspond to an application that a walking motion is necessary among the exercise application.

As another example of the correspondence between the gesture and the application, a golf swing gesture may correspond to a gold exercise application or a golf game application.

Figure 15:
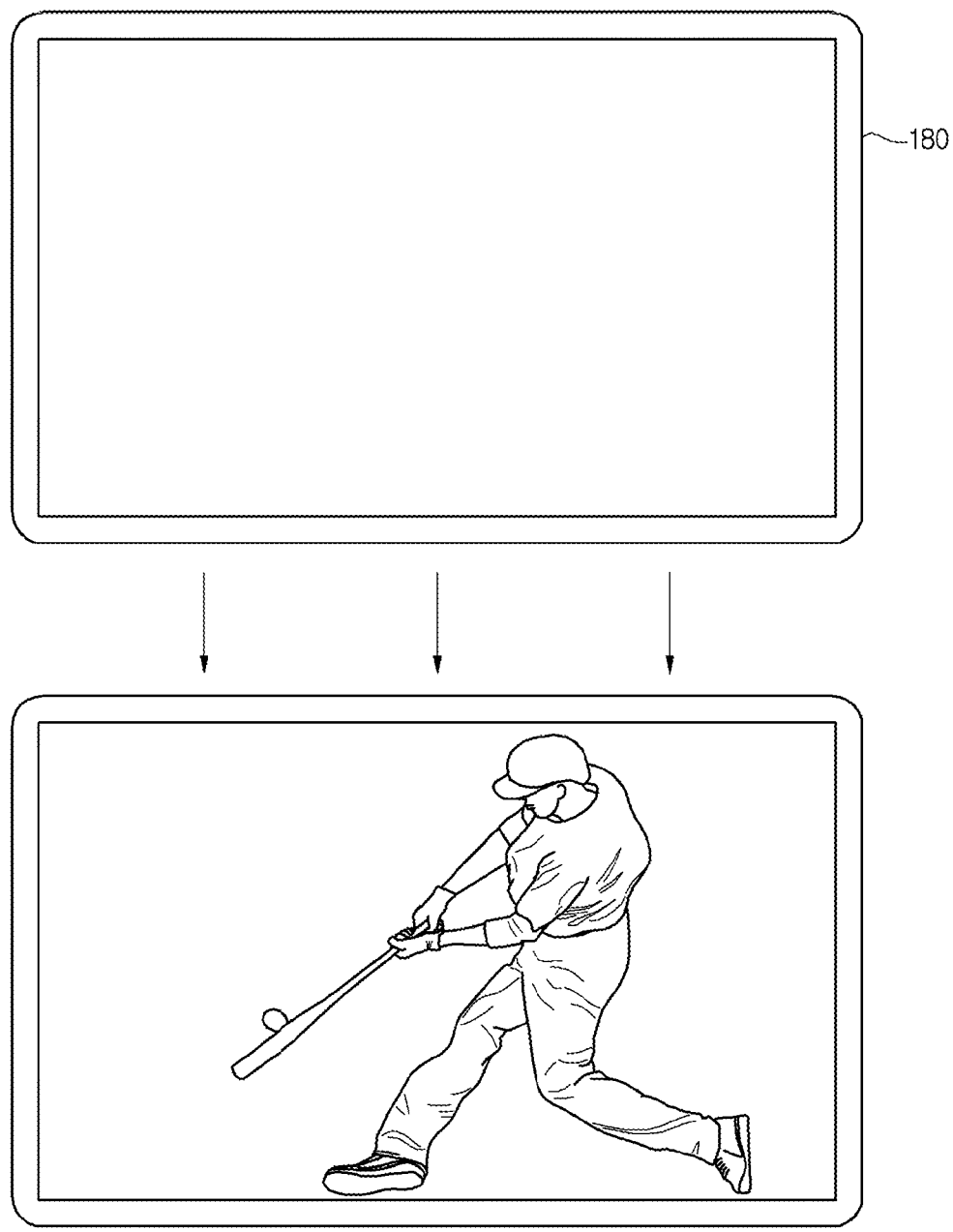
FIG. 15 illustrates, as an exemplary event, a view that a LIVE TV program starts to be received in an image display device.

FIG. 15 illustrates, as an example of an event, a view that a LIVE TV program starts to be received in an image display device 100.

As illustrated in FIG. 15, the image display device 100 may receive the LIVE TV program through the tuner 131 and the demodulation unit 132. The controller 170 of the image display device 100 may output the received LIVE TV program to the display unit 180 and, at the same time, output recommended application information on the basis of information on the received TV program.

The above-described operation of the controller 170 performed during receiving the LIVE TV program may be applied to a start to receive a reserved or preferred program.

FIG. 16a illustrates, as an example of an event, a view that a mid-program ad signal starts to be received and output on the display unit during receiving the LIVE TV signal in the image display device 100.

As illustrated in FIG. 16a, the image display device 100 may receive mid-program ads in the middle of receiving the TV program through the tuner 131 and the demodulation unit 132. The controller 170 may output the received mid-program ads on the display unit 180 and, at the same time, obtain information on the received mid-program ads as an event.

The information on the mid-program ads may include duration of the mid-program ads. Furthermore, the information on the mid-program ads may include, but not limited to, all types of information which may be a basis for recommending, to the user, an exercise application.

When the mid-program ads are obtained as an event, the controller 170 may recommend an exercise application performable by the user during the mid-program ads being output. Regarding this will be described in detail later.

FIG. 16b illustrates, as an example of an event, a view of a start to receive a TV program again when the mid-program-ads are completed during receiving the mid-program ads in the image display device 100.

As shown in FIG. 16b, the image display device 100 may receive a TV program in the middle of receiving the mid-program ads through the tuner 131 and the demodulation unit 132. The controller 170 may output the received TV program on the display unit 180 and, at the same time, obtain, as an event, the information on the received TV program and information on the mid-program ads received before receiving the TV program.

FIG. 17a illustrates, as an example of an event, a view at a predetermined time before a start time of a reserved or preferred program arrives during executing an application in the image display device 100.

As shown in FIG. 17a, the controller 170 may obtain all information on the reserved or preferred program and information on an application being executed. The information on the reserved or preferred program may include information that the reserved or preferred program starts after a predetermined time. The controller 170 may obtain, as an event, information that the reserved or preferred program starts after the predetermined time.

The controller 170 may recommend a related application on the basis of information on the application being executed or the information on the reserved or preferred program. Description regarding this will be described in detail later.

FIG. 17b is an example of an event, and illustrates a view at a predetermined time before a start time of the reserved or preferred program arrives in a LIVE TV mode in the image display device.

As shown in FIG. 17b, the controller 170 may obtain all information on the reserved or preferred program and information on a TV program being received. The information on the reserved or preferred program may include information that the reserved or preferred program starts after the predetermined time. The controller 170 may obtain, as an event, information that the reserved or preferred program starts after the predetermined time.

Information on the reserved or preferred program may include a kind of the reserved or preferred program, a remaining time to the start time of the reserved or preferred program, or information on the kind of the reserved or preferred program and information on the remaining time to the start time of the reserved or preferred program. The controller 170 may recommend, to the user, a necessary exercise application on the basis of information on the at least one reserved or preferred program.

In addition, the controller 170 may recommend, to the user, a necessary exercise application further on the basis of user information as well as the information on the reserved or preferred program and a TV program being received.

As an example, the controller 170 may recommend and display an application that the user may perform for a remaining time in order to fulfill a remaining exercise amount or burn remaining calories.

Hereinafter, referring to FIGS. 18 to 20, description is made about user's health information that is a basis of a recommended application.

An example of the user's health information may include user's body information or user's exercise information. The controller 170 may obtain the user's health information through, but not limited to, the health information sensing devices 5, 6, 7, 8, and 9 or inputs obtained from the remote controller 200 or a separate device (not shown).

As an example of the user information, user's health information is mainly described in detail in the specification. The user information described herein may be used as having the same meaning as the user's body information. The exercise information described herein may be used as having the same meaning as exercise amount information, user's exercise information or user's exercise amount information.

When an event is obtained, the controller 170 may output recommended application information on the basis of any one or more of the event and the obtained user's health information.

FIG. 18 illustrates an exemplary first health information application representing user's health information including exercise information and body information as the user's health information.

As illustrated in FIG. 18, the body information includes a height, a weight, a necessary amount of muscles, and a necessary amount of body fats 11, and the health information includes daily calories burned 12.

The controller 170 may obtain user's health information through the health information sensing devices 5, 6, 7, 8, and 9, and display the obtained health information through a bar graph 11, a histogram (not shown), or a circle graph (not shown).

The controller 170 may display the obtained body information and health information through a health information application, or obtain them through inputs in the health information application.

The controller 170 may display the remaining exercise amount to the user or recommend an exercise application 13 to the user on the basis of the obtained body information or exercise information.

As an example, the controller 170 may display the remaining exercise amount on the basis of the daily calories burned and recommend an exercise application for fulfilling the remaining exercise amount.

A method of outputting the exercise application information is the same as the method of outputting the recommended application information described in relation to FIGS. 4 to 7, and therefore detailed description regarding this is omitted.

FIG. 19 illustrates an exemplary application representing user's information including the exercise information and the body information as the user's health information according to an embodiment.

As shown in FIG. 19, the controller 170 outputs the obtained health information in a bar graph type and a circle graph type.

The controller 170 may display a weight, a skeletal muscle mass, an amount of body fats, an obesity rate, fat distribution, and physical development for each body part. The controller 170 may display, to the user, a recommended calorie and recommended calories burned 14 on the basis of the obtained body information.

The controller 170 may display the obtained user's health information for each day.

FIG. 20 is an exemplary application representing user's health information on a plurality of users in the image display device 100.

As illustrated in FIG. 20, the controller 170 may output the obtained health information on the plurality of users 15 and display a ranking according to exercise achievement among the plurality of users. The controller 170 may display performances of the plurality of users for each kind of exercise in a circle graph.

Hereinafter, referring to FIGS. 21 to 26, a method of recommending an application is described on the basis of an operation of the interworking device 99.

FIG. 21 illustrates an exemplary view that an application requiring a mat related operation is recommended on the basis of a mat 2.

As illustrated FIG. 21, when a mat sensing signal sensed through the mat 2 is obtained, the controller 170 recommends a first exercise application requiring an operation using the mat 2.

The first exercise application using the mat 2 may include a yoga application.

FIG. 22 illustrates an exemplary view that an application requiring a stick related operation is recommended on the basis of a stick 1.

As illustrated in FIG. 22, when a stick sensing signal sensed through the stick 1 is obtained, a second exercise application is recommended which requires an operation using the stick 1.

The second exercise application using the stick 1 may include a dumbbell exercise application.

FIG. 23 illustrates an exemplary view that a shoe related operation is recommended on the basis of the shoe 3.

As shown in FIG. 23, when a shoe sensing signal sensed through the shoe 3 is obtained, the controller 170 recommends an exercise application operated by using the shoe 3 or using pressure sensed through the shoe 3.

The exercise application using the shoe 3 may include a walking exercise application or a running exercise application.

FIG. 24 illustrates an exemplary view that an application requiring a bicycle related operation is recommended on the basis of the bicycle 4.

As illustrated in FIG. 24, when a bicycle sensing signal sensed through the bicycle 4 is obtained, the controller 170 recommends a bicycle related application requiring an operation using the bicycle 4.

The bicycle related application may include a bicycle exercise application or a bicycle race application.

FIG. 25 illustrates an exemplary view that an application related to each body information sensing device 5, 6, or 7 sensing user's body information is recommended.

As illustrated in FIG. 25, when a body information signal is obtained through the body information sensing devices 5, 6, and 7 including the blood pressure monitor 5, the weighing scale 6, the thermometer 7, or a body composition measuring module (not shown), the controller 170 recommends a body information application outputting the body information.

The body information application may include a disease diagnosing application or a body information display application.

FIG. 26 illustrates an exemplary view that an application related to each exercise information sensing device 8 or 9 sensing user's exercise information.

As illustrated in FIG. 26, when an exercise information signal is obtained through the exercise information sensing devices 8 and 9 including the life-band 9, the wearable watch (not shown), or the pedometer 8, the controller 170 recommends an exercise information application outputting the exercise information.

The exercise information application may include an application displaying a performed exercise amount and a remaining exercise amount.

Besides operations illustrated in FIGS. 25 and 26, the controller 170 may recommend, but not limited to, one or more exercise applications necessary to the user on the basis of the obtained health information.

Hereinafter, referring to FIGS. 27 to 29, description is made about an operation method of the image display device 100 which outputs recommended application information as an event when a TV program starts to be received.

Description about the operation of outputting the recommended application at the time of a start to receive the TV program may also be applied to an operation method of outputting a recommended application at the time of start of a reserved or preferred program.

The controller 170 may obtain information on a TV program being received at the time when the TV program starts to be received, and output application information related to the TV program on the basis of the obtained TV program information.

FIG. 27 illustrates an operation of outputting application information related to sports program among TV program.

When the information on the sports program is obtained, the controller 170 may control so as to output a sport application related to the corresponding sports program.

For example, as illustrated in FIG. 27, when a baseball broadcast program (sports program) is received, the controller 170 may output an exercise application (related sports application) requiring a motion performed in the baseball game.

An example of the exercise application related to a baseball game may include, but not limited to, a baseball game application.

FIG. 28 illustrates an exemplary view representing an operation of outputting application information related to a drama program among TV program.

The controller 170 may obtain information on the drama program and output application information related to a corresponding drama program.

For example, as illustrated in FIG. 28, when information on the drama program is obtained, the controller 170 may output an internet application outputting internet search result or internet information including internet search content related to the drama information.

The controller 170 may display one or more pieces of the drama information on the display unit 180. The drama information may include drama content, characters, synopsis, actors, directors, dramatists, audience evaluation, and viewer ratings.

For another example, when information on the drama program is obtained, the controller 170 may output the most frequently executed application among applications executed by the remote controller 200 or the external device (not shown) during receiving the corresponding drama program.

FIG. 29 illustrates an exemplary view representing an operation of outputting application information related to a news program among TV program.

When information on the news program, the controller 170 may output application information related to the corresponding news program.

As an example, as shown in FIG. 29, when information on a news program is obtained, the controller 170 may output a web site including news contents of the corresponding news program through an internet application.

As another example, as shown in FIG. 29, when information on a news program is obtained, the controller 170 may output search results of news contents of the corresponding news program.

Hereinafter, referring to FIG. 30, description is made about a method of outputting recommended application information as an event at the time of a start to receive mid-program ads.

FIG. 30 illustrates an operation of the image display device 100 obtaining a start of mid-program ads as an event and outputting recommended application information.

As illustrated in FIG. 30, when the start of mid-program ads is obtained as an event during executing a LIVE TV mode, the controller 170 may calculate a completion time of the mid-program ads, and output an exercise application executable from a time of the calculation to the calculated completion time of the mid-program ads.

In outputting the exercise application executable between corresponding times, the controller 170 may output the application further on the basis of user's health information.

Hereinafter, referring to FIGS. 31 to 36, description is made about a method of outputting recommended application information when pluralities of events are obtained.

FIG. 31 illustrates an operation method of the image display device 100 when sensing the interworking device 99 is obtained as an event during displaying the LIVE TV mode.

When the sensing of the interworking device 99 is obtained as the event during receiving a TV program in the LIVE TV mode, the controller 170 may output recommended application information on the basis of both of the interworking device 99 and information on the TV program being received.

The controller 170 may collect one or more reference applications related to the sensed interworking device 99 and output recommended application information related to the TV program being received among the collected one or more reference applications.

For example, as illustrated in FIG. 31, when the stick 1 (interworking device) is sensed during receiving a baseball broadcast program, the controller 170 may collect a dumbbell exercise application, a cheerleading exercise application, and a baseball game application (one or more collected reference applications related to the stick), and then output the cheerleading exercise application (recommended application) related to the baseball broadcast program (TV program being received).

FIG. 32 illustrates an operation method when sensing the interworking device 99 is obtained as an event during receiving mid-program ads.

When the sensing of the interworking device 99 is obtained as an event during receiving the mid-program ads, the controller 170 may output recommended application information on the basis of the interworking device 99 and a completion time of the mid-program ads.

When the interworking device 99 is sensed and the completion time of the mid-program ads is calculated as a first time later, the controller 170 may output an exercise application executable for the first time among applications related to the interworking device 99.

For example, as illustrated in FIG. 32, when the mat 2 (interworking device) is sensed at 10 minutes (the first time) before the completion time of mid-program ads, the controller 170 may output an exercise application executable for 10 minutes (the first time) among applications related to the mat 2 (interworking device).

When the interworking device 99 is sensed during receiving the mid-program ads, the controller 170 may output a related application on the basis of the interworking device 99 and a completion time of the mid-program ads, and further on the basis of the user's health information.

For example, when the mat 2 is sensed at 10 minutes (the first time) before the completion time of the mid-program ads, the controller 170 may output an exercise application that is related to the mat 2, executable for 10 minutes (the first time), and able to fulfill a remaining exercise amount (user's health information) of the user.

FIG. 33 illustrates a case where the interworking device 99 is sensed before a predetermined time from a start time of a reserved or preferred program.

When the interworking device 99 is sensed before a second time from the start time of the reserved or preferred program, the controller 170 may recommend an application on the basis of the interworking device 99 and the second time remained to the start of the reserved or preferred program.

When the start time of the reserved or preferred program is calculated after the second time at the time of sensing the interworking device 99, the controller 170 may output an exercise application executable for the second time among applications related to the interworking device 99.

For example, as illustrated in FIG. 33, when the stick 1 (the interworking device) is sensed before 15 minutes (the second time) from the start time of the reserved or preferred time, the controller 170 may output an exercise application executable for 15 minutes (the second time) among exercise applications related to the stick 1.

When the interworking device 99 is sensed before the second time from the reserved or preferred program, the controller 170 may output a related application on the basis of interworking device 99 and the start time of the reserved or preferred program, and further on the basis of the user's health information.

For example, as shown in FIG. 33, when the stick is sensed before 15 minutes (the second time) from the start time of the reserved or preferred program, the controller 170 may output an exerciser application for fulfilling a remained exercise amount on the basis of the exercise information on the user among one or more exercise applications that are related to the stick 1 and are executable for 15 minutes (the second time).

FIG. 34 illustrates an operation method in a case where a LIVE TV mode starts and a TV program is received at a completion time of mid-program ads during executing an application in mid-program ad time.

When the LIVE TV mode starts and a first TV program is received at the completion time of the mid-program ads in the middle of executing a reference application during receiving the mid-program ads, the controller 170 may output a first application related to the reference application executed during receiving the mid-program ads among a plurality of applications related to the first TV program.

For example, as illustrated in FIG. 34, the controller 170 may output a cheerleading application (the first application) related to the reference application (the yoga exercise application) executed in the mid-program time between the cheerleading exercise application and a baseball game application (a plurality of applications related to the TV program) related to a sports program (the first TV program).

In addition, the controller 170 may display a popup menu, display a list of one or more recommended applications, obtain one selection among names of the one or more recommended applications, and output a selected third application.

FIG. 35 illustrates a case where a predetermined time arrives before the start time of the reserved or preferred program during executing an application.

When the reserved or preferred program is sensed to start after a preset first time during executing a first application, the controller 170 may output a second application on the basis of the first application and the first time.

For example, as illustrated in FIG. 35, when a reserved program is sensed to start after 15 minutes (a first time) during executing a yoga application (the first application), the controller 170 may output an application (the second application) that is related to the yoga application (the first application) and executable for 15 minutes (the first time).

In addition, when a reserved or preferred program is sensed to start after the preset first time during executing the first application, the controller 170 may output the second application on the basis of the first application, information on the reserved or preferred program, and the first time.

In addition, the controller 170 may display at least one second application, obtains a selection on one third application among the second applications, and then output the selected third application.

FIG. 36 illustrates a case where a second TV program, which is a reserved or preferred program, starts during executing a first TV program in a LIVE TV mode.

The controller 170 may obtains a selection on one of the first and second TV programs and output an exercise application related to the selected program.

For example, as illustrated in FIG. 36, when a reserved program (the second TV program) starts during executing a baseball program (the first TV program), the controller 170 may obtain an user's selection between the baseball program and the reserved program through the popup window 50 and output an exercise application related to the selected program.

In outputting the recommended application at the time of obtaining the plurality of events, the controller 170 may also output the recommended application further on the basis of, but not limited to, user's health information.

Hereinafter, referring to FIGS. 37 to 47, description is made about an operation method of the image display device 100 outputting recommended application information or recommending an application.

FIG. 37 illustrates an exemplary screen that shows an operation of displaying animation of an application to be recommended and executes a recommended application at the time of selecting animation.

The controller 170 outputs one or more animations 51 of one or more applications related to an event or user's health information For example, as illustrated FIG. 37, the controller 170 may output an avatar 51 (animation) doing yoga gestures related to the yoga application (the first application) in relation to the sensed mat 2 (event) to the display unit 180 in the image display device 100.

When a selection of the first animation is obtained among the one or more animations 51, the controller 170 may execute the first application corresponding to the selected first animation and output an execution screen of the first application.

For example, as illustrated in FIG. 37, the controller 170 may execute the yoga application (the first application) corresponding to the selected avatar doing yoga gestures and output an execution screen of the yoga application on the display unit 180.

FIG. 38 illustrates an exemplary view representing an operation of the image display device 100 displaying a name list of recommended applications and outputting an application corresponding to a selected name as a method of outputting recommended application information.

As illustrated in FIG. 38, the controller 170 displays a name list 52 of one or more applications on the basis of events or user information. When a selection of a name of one first application is obtained among the one or more application names, the controller 170 may execute the first application corresponding to the selected first application name and output an execution screen of the first application on the display unit 180.

FIGS. 39 to 42 are exemplary views representing operations of the image display device 100 displaying an icon list of recommended applications as a method of outputting recommended application information.

Figure 39:
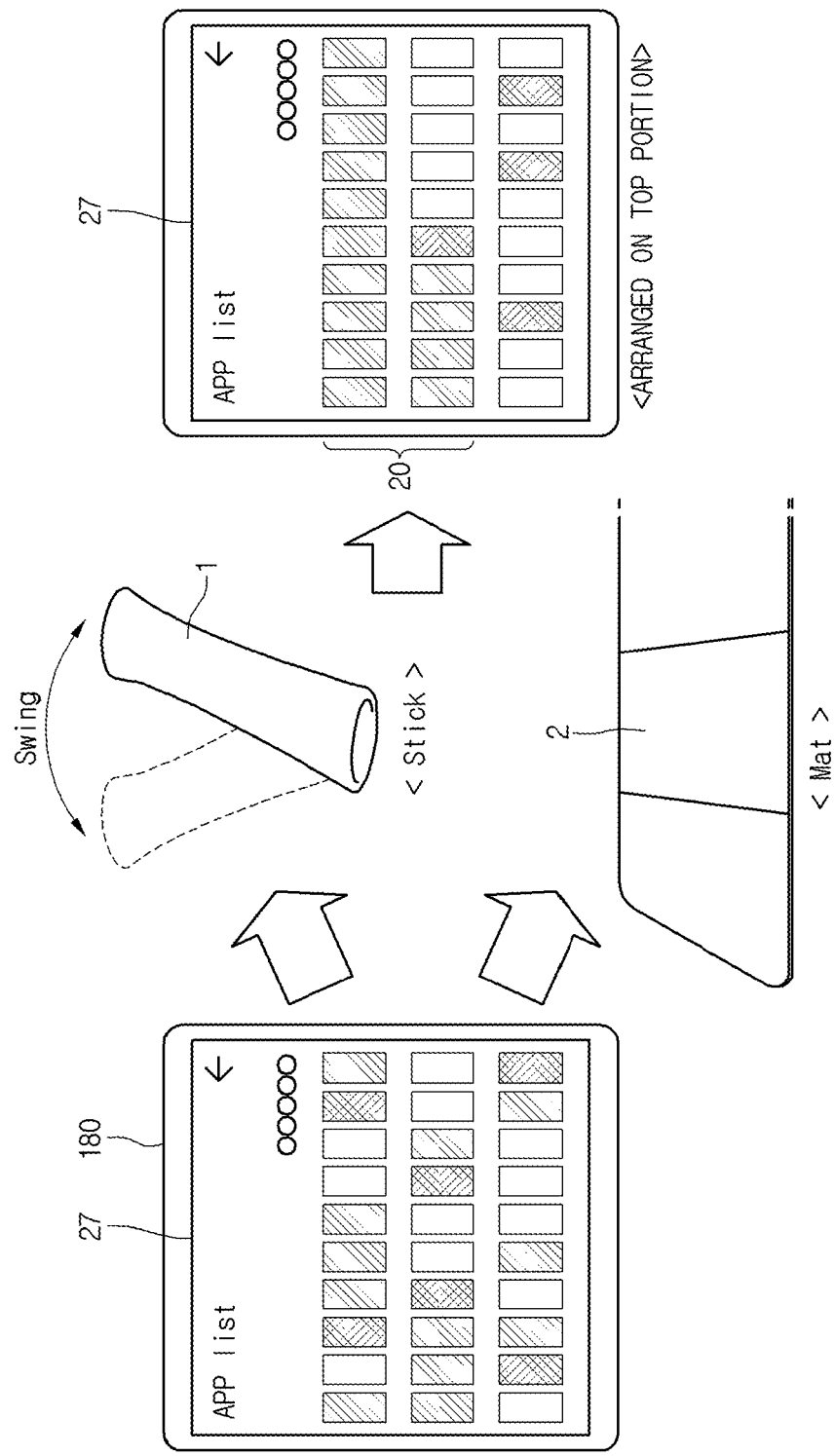

As illustrated in FIG. 39, the controller 170 arranges and displays one or more recommended application icons related to the event (the mat 2 or the stick 1) in the list 27 of the one or more application icons on a top portion 20 of the icon list 27.

In addition, the controller 170 may arrange and display recommended application icons having higher priorities among the one or more recommended application icons in order from the leftmost sides 21, 22, and 23 of the top portion 20.

Figure 40:
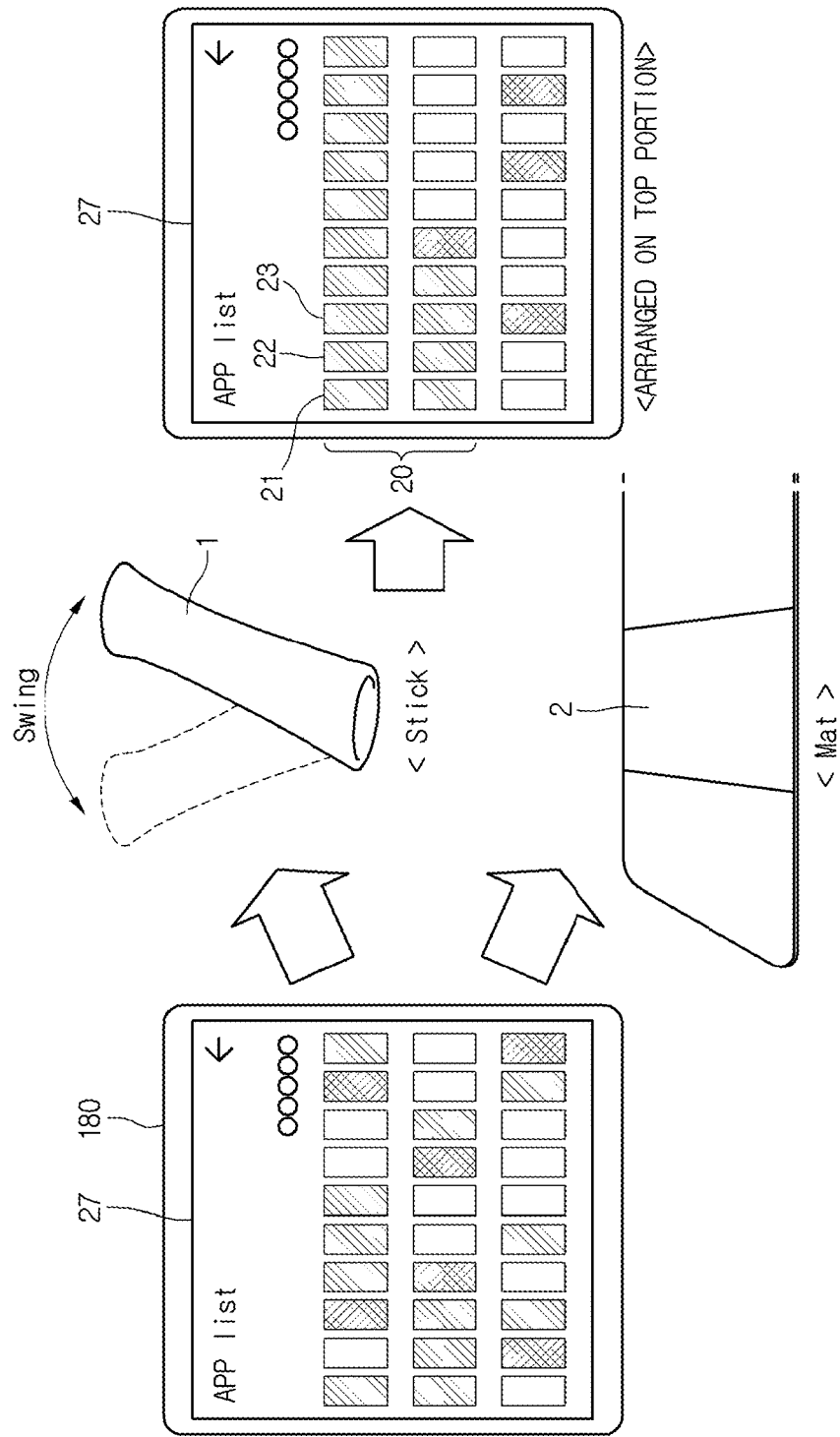

For example, as illustrated in FIG. 40, the controller 170 may preferentially arrange and display exercise application icons for fulfilling a remained exercise amount based on the user information among the one or more recommended application icons in order from the leftmost sides 21, 22, and 23 of the top portion 20.

The controller 170 may visually differentiate one or more recommended application icons related to an event (the mat 2 or the stick 1) from other icons among the one or more application icons, and display them.

Figure 41:
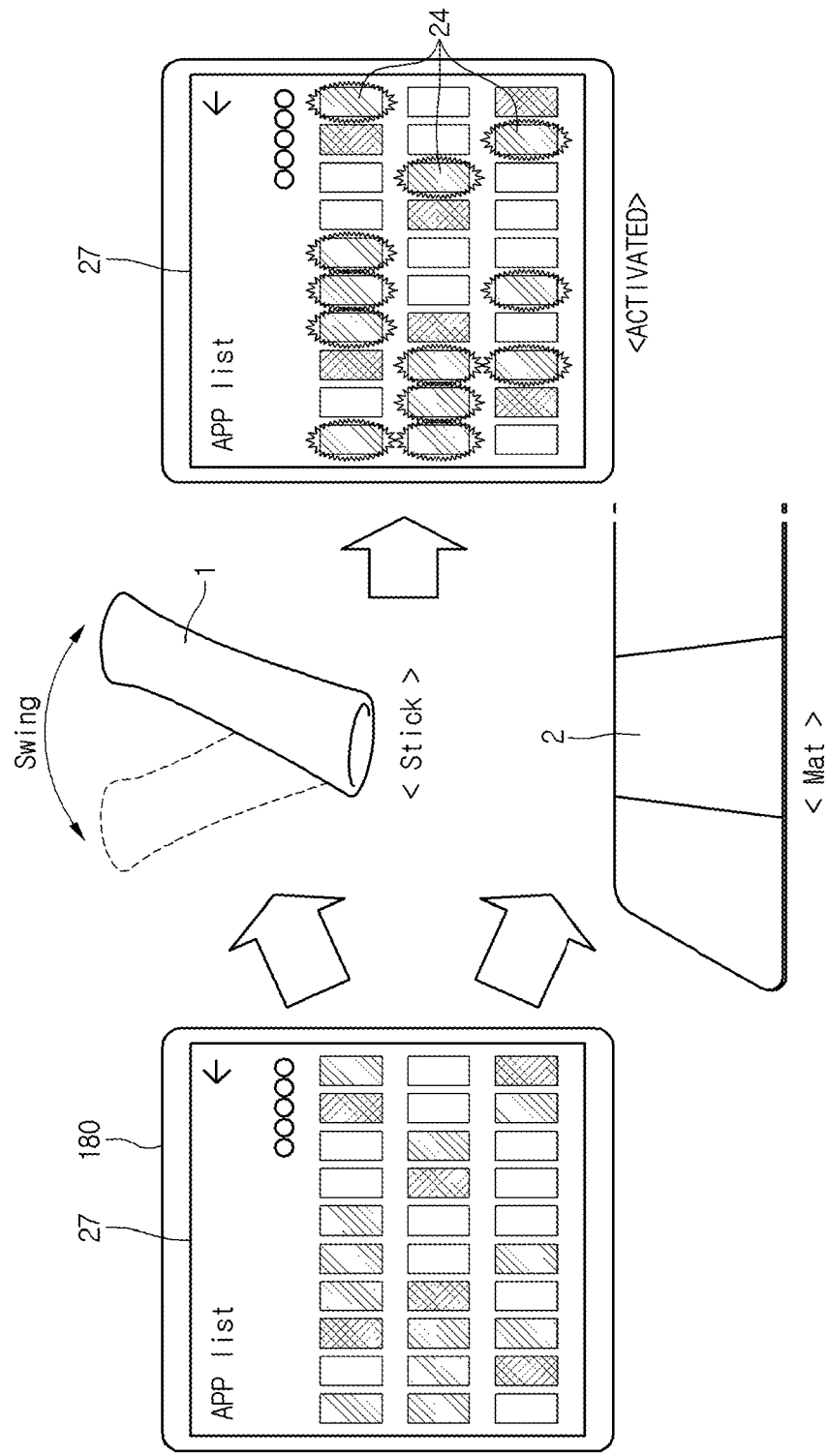

For example, as illustrated in FIG. 41, the controller 170 may light-emitting-display 24 surrounding areas of the recommended application icons.

Figure 42:
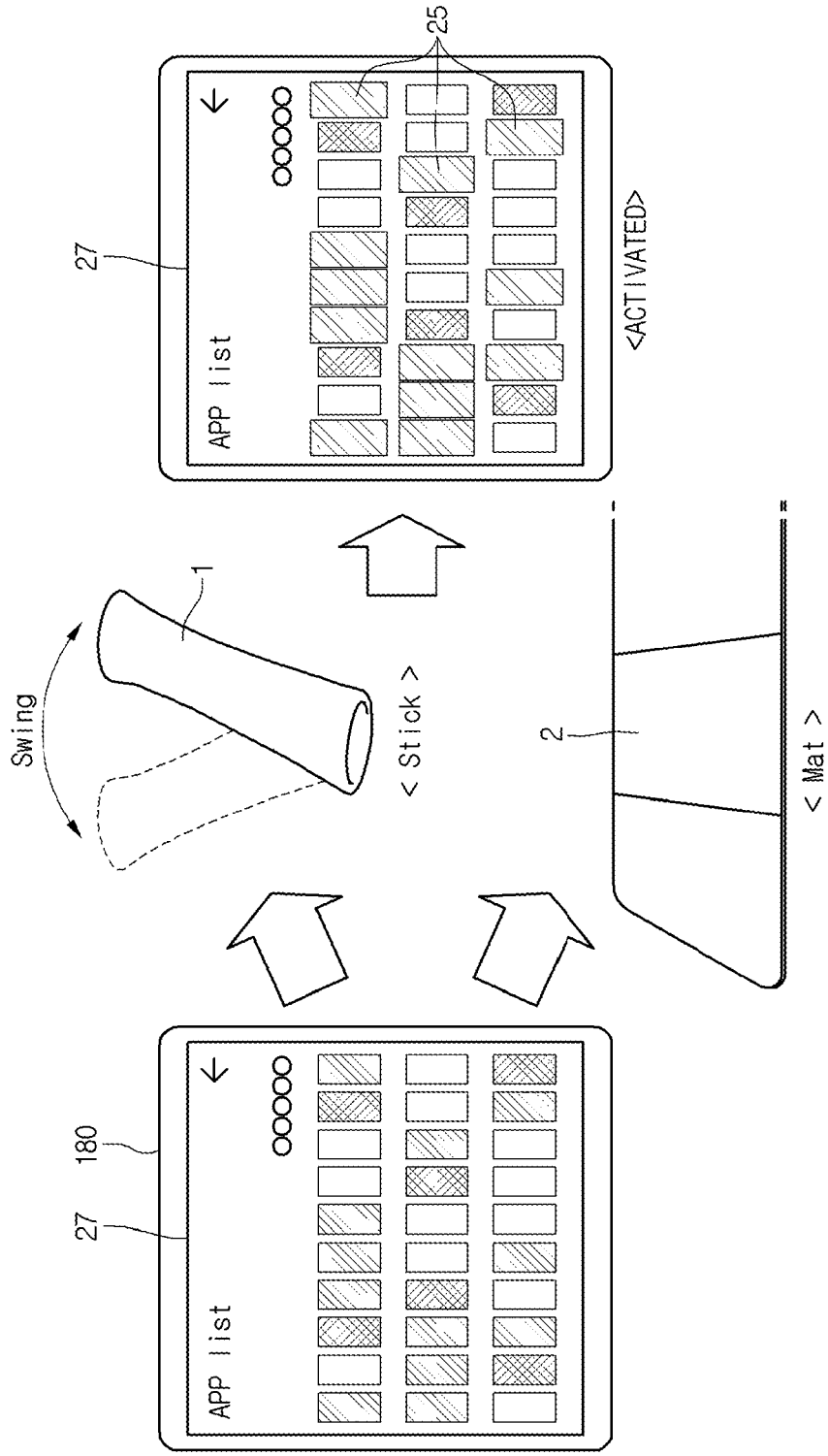

For another example, as illustrated in FIG. 42, the controller may enlarge and display 25 the recommended application icons in a certain magnification or more (e.g., 1.5 times)

Figure 43:
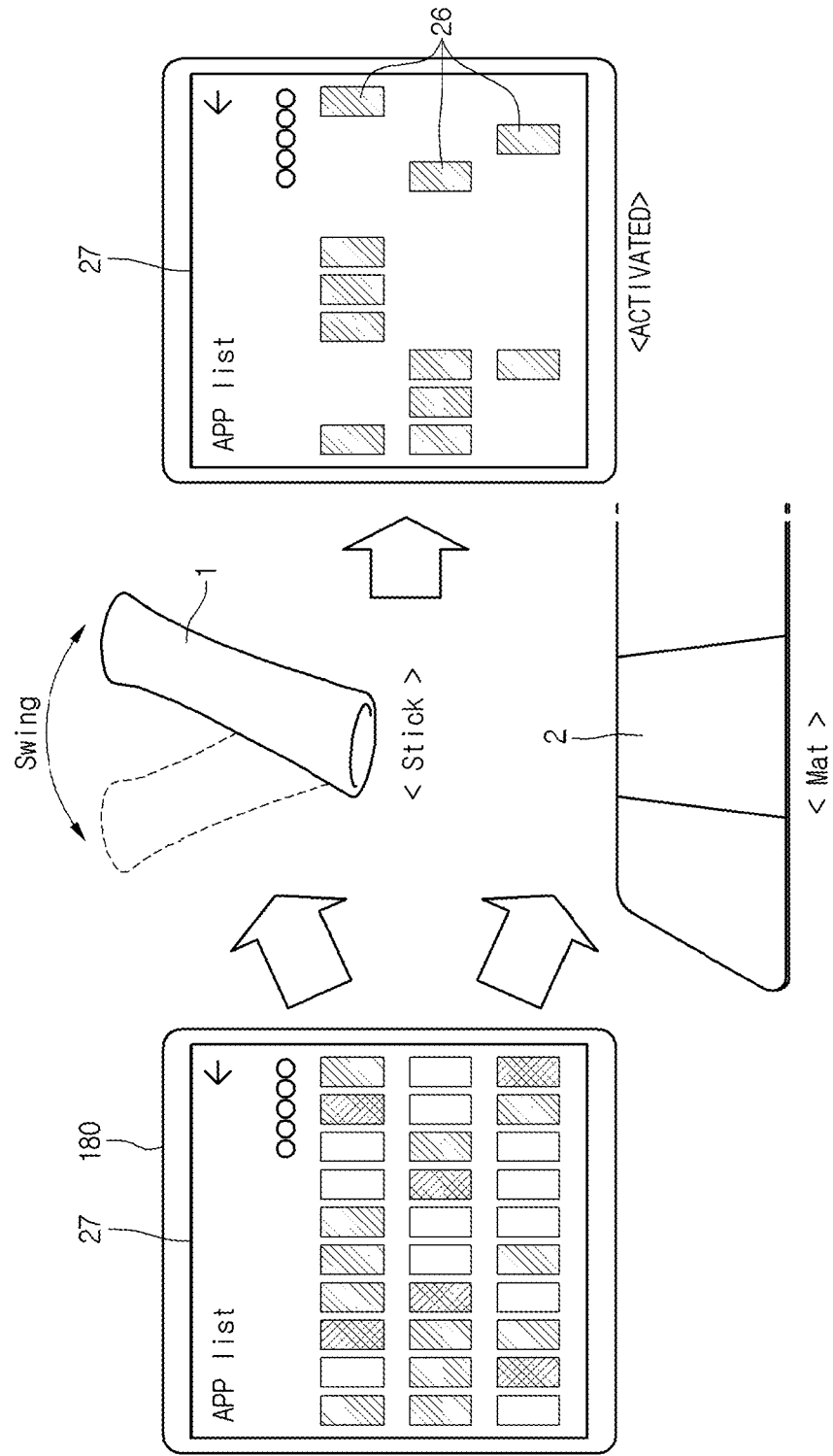

For another example, as illustrated in FIG. 43, the controller 170 may display 26 only the recommended application icons and may not display or may shade, with the same color as that of the background, other icons on the icon list.

FIGS. 44 to 47 illustrate a case of displaying an execution screen of the recommended application as another example of outputting the recommended application information.

As an example of displaying the execution screen, as illustrated in FIG. 44, the controller 170 may execute a recommended application and display an execution screen of the recommended application in full screen 29.

As another example of display the execution screen, as illustrated in FIG. 45, the controller 170 may execute one or more recommended applications, and display respective execution screens of the recommended applications on a first divided screen 30 and a second divided screen 31 into which an entire screen is divided by the number of the recommended applications.

As another example of displaying the execution screen, as illustrated in FIG. 46, the controller 170 may execute a recommended application, and partially display an execution screen of the executed application in a thumbnail image 40 in the entire screen.

As another example of displaying the execution screen, as illustrated in FIG. 47, the controller 170 may execute one or more recommended applications, and display respective execution screens of the executed recommended applications in, but not limited to, first to third thumbnail images 41, 42, and 43.

According to an embodiment, the above-described method can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and also include implementation in a carrier wave (such as data transmission through the Internet) type.

As can be seen from the foregoing, the image display device in accordance with the embodiments are not limited to the configuration and method of the embodiments described above, but all or some components of the embodiments may be configured to be selectively combined such that various modifications of the embodiments can be implemented.

The invention claimed is:

1. A method for operating a first device comprising a display, the method comprising:
   receiving a broadcast signal comprising a broadcast program;
   displaying, on the display, the broadcast program;
   communicating with an external device during the displaying of the broadcast program, wherein the external device is configured to sense a physical interaction, and wherein the external device is coupled to the first device;
   receiving an advertisement via the broadcast signal;
   identifying at least one recommended application from among a plurality of applications executable at the first device, wherein the at least one recommended application is identified from among the plurality of applications based on content of the broadcast program, length of time of the advertisement, and device type of the external device;
   displaying, on the display, a list comprising the at least one recommended application;
   displaying an execution screen of an application selected from among the at least one recommended application of the list, wherein the execution screen comprises data received from the external device;
   terminating the displaying of the execution screen and displaying the broadcast program, after passing of the length of time of the advertisement.

2. The method according to claim 1, wherein:
   the external device comprises an exercise equipment that includes at least a stick, a mat, a bicycle or a shoe;
   the physical interaction comprises at least pressure applied to the exercise equipment and movement of the exercise equipment; and
   wherein the at least one recommended application is identified further based on the physical interaction.

3. The method according to claim 1, wherein:
   the advertisement further includes an ending time of the advertisement; and
   wherein the at least one recommended application is identified further based on the ending time of the advertisement.

4. The method according to claim 1, further comprising obtaining preferred program information or reserved program information from the received broadcast signal, wherein:
   the preferred program information or the reserved program information comprises information related to a starting time of a program or information related to a type of the program; and
   wherein the at least one recommended application is identified further based on the information related to the starting time of the program or the information related to the type of the program.

5. The method according to claim 1, wherein the list further comprises an animation or an avatar representing the at least one recommended application.

6. The method according to claim 5, further comprising:
   executing an application corresponding to the animation or the avatar in response to selection of the animation or the avatar.

7. The method according to claim 1, wherein the list further comprises at least an application icon or a name.

8. The method according to claim 1, wherein:
   each of the plurality of applications is displayed as an icon or name in the list; and
   an icon or name corresponding to the at least one recommended application is displayed more distinctively than other icons in the list.

9. The method according to claim 8, wherein the displaying the icon or name corresponding to the at least one recommended application more distinctively comprises displaying the icon or name at a top portion or a leftmost side of the list.

10. The method according to claim 8, wherein the displaying the icon or name corresponding to the at least one recommended application more distinctively comprises highlighting the icon or name in the list.

11. The method according to claim 8, wherein the displaying the icon or name corresponding to the at least one recommended application more distinctively comprises displaying the icon or name larger than other icons or names in the list.

12. The method according to claim 1, further comprising:
displaying a thumbnail image corresponding to the execution screen when the advertisement is displayed on a full screen of the display.

13. The method according to claim 12, further comprising:
displaying the execution screen, instead of the advertisement and the thumbnail image, on the full screen of the display.

14. The method according to claim 1, further comprising:
obtaining user information; and
wherein the at least one recommended application is identified further based on the obtained user information.

15. The method according to claim 14, wherein:
the user information comprises a user's health information; and
the user's health information comprises at least first information related to the user's body or second information related to the user's exercise.

16. The method of claim 15, wherein the external device comprises a body information sensing device or an exercise information sensing device.

17. The method according to claim 16, wherein the first information is obtained from the body information sensing device and the second information is obtained from the exercise information sensing device.

* * * * *